US012612042B2

(12) United States Patent
Stout, II et al.

(10) Patent No.: US 12,612,042 B2
(45) Date of Patent: Apr. 28, 2026

(54) SELF PROPELLED TRAILER SYSTEMS

(71) Applicant: FCA US LLC, Auburn Hills, MI (US)

(72) Inventors: Mark E Stout, II, Auburn Hills, MI (US); Travis D Bechtel, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 124 days.

(21) Appl. No.: 18/758,037

(22) Filed: Jun. 28, 2024

(65) Prior Publication Data

US 2024/0351585 A1      Oct. 24, 2024

Related U.S. Application Data

(63) Continuation-in-part of application No. 18/308,836, filed on Apr. 28, 2023, and a continuation-in-part of application No. 18/190,588, filed on Mar. 27, 2023.

(60) Provisional application No. 63/423,218, filed on Nov. 7, 2022.

(51) Int. Cl.
*B60W 30/18* (2012.01)
*B60D 1/44* (2006.01)
(Continued)

(52) U.S. Cl.
CPC ......... *B60W 30/18145* (2013.01); *B60D 1/44* (2013.01); *B60D 1/62* (2013.01); *B60W 10/04* (2013.01); *B60W 10/18* (2013.01); *B60W 10/20* (2013.01); *B60W 30/18036* (2013.01); *B60W 2300/14* (2013.01); *B60W 2520/22* (2013.01);
(Continued)

(58) Field of Classification Search
CPC ........... B60W 30/18145; B60W 10/04; B60W 10/18; B60W 10/20; B60W 30/18036; B60W 2300/14; B60W 2520/22; B60W 2520/28; B60W 2540/18; B60W 2710/18; B60W 2710/207; B60W 2720/106;
(Continued)

(56) References Cited

U.S. PATENT DOCUMENTS 9,004,519 B1 *   4/2015   Beech ................... B62D 13/06
                                                    280/442
2001/0054524 A1 *  12/2001  Masters ............... B62D 13/025
                                                    280/426

(Continued)

FOREIGN PATENT DOCUMENTS

DE            102011003791 B4 *  5/2019  ............... B60D 1/62

*Primary Examiner* — Sze-Hon Kong
(74) *Attorney, Agent, or Firm* — Jeremy J. Klobucar

(57) ABSTRACT

A multi-vehicle control system (MVCS) for control of a multi-vehicle system having independently powered and steered lead and trailer vehicles connected by a slidable length sensing tow bar system. The MVCS includes a controller configured to receive throttle, brake, and steering signals from the lead vehicle, receive signals from the tow bar system indicating an extension length of the tow bar system, a front angle deviation of the lead vehicle, and a rear angle deviation of the trailer vehicle. The controller is further configured to determine, based on the received signals, a trailer vehicle acceleration/deceleration output and a trailer vehicle steering output, determine a driving scenario of the multi-vehicle system, and operate the multi-vehicle system based on the determined driving scenario and the determined trailer vehicle acceleration/deceleration output and trailer vehicle steering output.

18 Claims, 15 Drawing Sheets

(51) Int. Cl.

| | |
|---|---|
| *B60D 1/62* | (2006.01) |
| *B60W 10/04* | (2006.01) |
| *B60W 10/18* | (2012.01) |
| *B60W 10/20* | (2006.01) |
| *B62D 59/04* | (2006.01) |

(52) U.S. Cl.
CPC ..... *B60W 2520/28* (2013.01); *B60W 2540/18* (2013.01); *B60W 2710/18* (2013.01); *B60W 2710/207* (2013.01); *B60W 2720/106* (2013.01); *B60W 2754/30* (2020.02); *B62D 59/04* (2013.01)

(58) Field of Classification Search
CPC ....... B60W 2754/30; B60D 1/44; B60D 1/62; B62D 59/04
See application file for complete search history.

(56) References Cited

U.S. PATENT DOCUMENTS

| | | | | |
|---|---|---|---|---|
| 2019/0385461 A1* | 12/2019 | Blomstrand | ........... | B60D 1/481 |
| 2022/0017161 A1* | 1/2022 | Layfield | ............. | B62D 53/0871 |
| 2022/0126714 A1 | 4/2022 | Bucknor et al. | | |
| 2022/0287215 A1* | 9/2022 | Jones | ................... | A01B 59/004 |
| 2023/0082801 A1* | 3/2023 | Laine | ................... | B62D 59/04 |
| | | | | 280/476.1 |
| 2023/0097576 A1* | 3/2023 | Laine | ................... | B60D 1/015 |
| | | | | 280/412 |
| 2023/0343220 A1* | 10/2023 | Gopalswamy | ......... | B60D 1/145 |
| 2023/0415526 A1* | 12/2023 | Hoeper | .................. | B60D 1/242 |
| 2024/0034405 A1* | 2/2024 | Rust | ...................... | B62D 6/003 |
| 2025/0206088 A1* | 6/2025 | Möller | ................... | B60D 1/62 |
| 2025/0304033 A1* | 10/2025 | Bieber | ............. | B60W 50/0097 |

* cited by examiner

Active Steering Axle
Passive Following Axle
Active Following Axle
Non-Steering Axle
Ball Hitch/Joint

SELF PROPELLED TRAILER SYSTEMS

CROSS-REFERENCE TO RELATED APPLICATIONS

This application is continuation-in-part of U.S. patent application Ser. No. 18/190,588, filed on Mar. 27, 2023 and U.S. patent application Ser. No. 18/308,836, filed on Apr. 28, 2023, each of which claims the benefit of U.S. Provisional Pat. App. No. 63/423,218 filed Nov. 7, 2022, the contents of which are incorporated herein by reference thereto.

FIELD

The present application relates generally to vehicle trailer systems and, more particularly, to a multi-vehicle control system for self-propelled vehicle trailer systems.

BACKGROUND

Trailer towing is a complex task that typically requires significant driver attention and skill. One drawback of conventional towing is that the trailer passively responds to mechanical inputs and constraints of the towing vehicle. As such, trailer systems typically do not follow the exact path of the lead vehicle, which may increase the possibility of damage to the trailer or surrounding property, particularly during turning maneuvers. Moreover, towing/hitch systems transfer load from the trailer to the rear of lead vehicle, thus requiring the lead vehicle to have a payload carrying capability proportional to the trailer weight. Additionally, the towing/hitch systems can potentially induce undesirable forces to the lead vehicle that can potentially destabilize the forward motion of the lead vehicle (sway) or impart harsh impacts/noises into the lead vehicle chassis under acceleration and deceleration conditions. Accordingly, while such conventional trailer systems work well for their intended purpose, there is a desire for improvement in the relevant art.

SUMMARY

In accordance with an example aspect of the invention, a multi-vehicle control system (MVCS) is provided for control of a multi-vehicle system having independently powered and steered lead and trailer vehicles connected by a slidable length sensing tow bar system. In one example implementation, the MVCS includes a controller in signal communication with the lead vehicle, the trailer vehicle, and the slidable length sensing tow bar system. The controller is configured to receive throttle, brake, and steering signals from the lead vehicle, receive signals from the tow bar system indicating an extension length of the tow bar system, a front angle deviation of the lead vehicle, and a rear angle deviation of the trailer vehicle. The controller is further configured to determine, based on the received signals, a trailer vehicle acceleration/deceleration output and a trailer vehicle steering output, determine a driving scenario of the multi-vehicle system, and operate the multi-vehicle system based on the determined driving scenario and the determined trailer vehicle acceleration/deceleration output and trailer vehicle steering output.

In addition to the foregoing, the described MVCS may include one or more of the following features: wherein the extension length of the tow bar system is determined by a length sensor operably associated with a free sliding bar of the tow bar system; wherein the front angle deviation is determined from a first angle sensor configured to sense an angle between the lead vehicle and a first end of the tow bar system, and wherein the rear angle deviation is determined from a second angle sensor configured to sense an angle between the trailer vehicle and a second end of the tow bar system; and wherein the trailer vehicle acceleration/deceleration output is determined by the sum of (i) a lead vehicle acceleration/deceleration output, based on a driver throttle and/or brake pedal input, multiplied by a first controller gain, and (ii) the extension length of the tow bar system multiplied by a second controller gain.

In addition to the foregoing, the described MVCS may include one or more of the following features: wherein the trailer vehicle steering output is determined by the sum of (i) the front angle deviation multiplied by a first controller gain, (ii) the rear angle deviation multiplied by a second controller gain, and (iii) a lead vehicle steering output, based on a driver steering wheel input, multiplied by a third controller gain; and wherein the controller is further configured to determine if a steering angle of the lead vehicle is above a predetermined threshold indicating a tight turning maneuver of the lead vehicle, and adjust the third controller gain if the determined steering angle is above the predetermined threshold to thereby induce a steering bias to the trailer vehicle to an outside of a turning path of the lead vehicle.

In addition to the foregoing, the described MVCS may include one or more of the following features: wherein the controller is further configured to detect an upcoming tight turning maneuver of the lead vehicle, and apply an offset value to the first and second controller gains to thereby bias the trailer vehicle horizontally from the lead vehicle in a direction opposite of the detected tight turning maneuver to thereby stage the trailer vehicle for the tight turning maneuver; wherein the controller is further configured to (i) detect a turning maneuver of the lead vehicle, (ii) temporarily set the trailer vehicle steering output to zero to maintain a straight path of the trailer vehicle while the lead vehicle executes a portion of the turning maneuver, (iii) monitor one or more wheel speed sensors of the trailer vehicle to determine the trailer vehicle has traveled a predefined distance with the steering output at zero, and (iv) subsequently initiate a turning maneuver of the trailer vehicle when the trailer vehicle has traveled the predefined distance.

In addition to the foregoing, the described MVCS may include one or more of the following features: wherein the controller is further programmed to control the trailer vehicle through the turning maneuver, including (i) adjusting the first, second, and third controller gains to decrease a distance between the lead vehicle and the trailer vehicle, and (ii) further adjusting the first, second, and third controller gains to extend turning of the trailer vehicle after the lead vehicle has exited the turning maneuver; and wherein the determined driving scenario is a low-speed forward driving scenario, and wherein the controller is further configured to control the relative positions of the lead vehicle and the trailer vehicle such that a nominal length of the slidable tow bar system is set to a minimum to thereby provide a large amount of relative extension to enable the multi-vehicle system to perform a turning maneuver.

In addition to the foregoing, the described MVCS may include one or more of the following features: wherein the determined driving scenario is a high-speed forward driving scenario, and wherein the controller is further configured to control the relative positions of the lead vehicle and the trailer vehicle such that a nominal length of the slidable tow bar system is set to a maximum to thereby provide a large amount of relative compression in the event of a sudden braking by the lead vehicle; and wherein the determined driving scenario is a high-speed forward driving scenario, and wherein the controller is further configured to apply an offset value to the first and second controller gains to thereby bias the trailer vehicle horizontally from the lead vehicle to facilitate improving visibility behind the lead vehicle and/or improving aerodynamic performance of the multi-vehicle system.

In addition to the foregoing, the described MVCS may include one or more of the following features: wherein the determined driving scenario is a low-speed reverse driving scenario, and wherein the controller is further configured to control the relative positions of the lead vehicle and the trailer vehicle such that a nominal length of the slidable tow bar system is set to a minimum to thereby provide a large amount of relative extension to enable the multi-vehicle system to perform a reverse turning maneuver; and wherein the determined driving scenario is a low-speed reverse driving scenario, and wherein the controller is further configured to control a front axle of the trailer vehicle based on steering inputs on the lead vehicle such that the lead vehicle steers in a direction that opposes a steering direction of the trailer vehicle.

In addition to the foregoing, the described MVCS may include one or more of the following features: wherein the determined driving scenario is a low-speed reverse driving scenario, and wherein the controller is further configured to (i) determine a trailer steering output, based on a driver steering wheel input on the lead vehicle, and (ii) determine a lead vehicle steering output, determined by: the front angle deviation multiplied by a first controller gain, subtracted by the rear angle deviation multiplied by a second controller gain, and further subtracted by the trailer steering output multiplied by a third controller gain.

In accordance with another example aspect of the invention, a control method is provided for a multi-vehicle system having a multi-vehicle control system (MVCS) in signal communication with independently powered and steered lead and trailer vehicles connected by a slidable length sensing tow bar system. In one example, the method includes receiving, by a controller of the MVCS, throttle, brake, and steering signals from the lead vehicle; receiving, by the controller, signals from the tow bar system indicating an extension length of the tow bar system, a front angle deviation of the lead vehicle, and a rear angle deviation of the trailer vehicle; determining, by the controller and the received signals, a trailer vehicle acceleration/deceleration output and a trailer vehicle steering output; determining, by the controller, a driving scenario of the multi-vehicle system; and operating, by the controller, the multi-vehicle system based on the determined driving scenario and the determined trailer vehicle acceleration/deceleration output and trailer vehicle steering output.

In addition to the foregoing, the described method may include one or more of the following features: wherein the extension length of the tow bar system is determined by a length sensor operably associated with a free sliding bar of the tow bar system; and wherein the front angle deviation is determined from a first angle sensor configured to sense an angle between the lead vehicle and a first end of the tow bar system, and wherein the rear angle deviation is determined from a second angle sensor configured to sense an angle between the trailer vehicle and a second end of the tow bar system.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein are control systems for multi-vehicle systems that include a lead vehicle and a self-propelled, battery electric vehicle (BEV) based trailer system. The BEV trailers may be, for example, a wagon style (e.g., wheels at four corners) or traditional chassis trailer with a steerable axle such as those shown in FIGS. 1-4. Additionally, the BEV trailers utilize a tow bar system such as that shown and described in FIGS. 5-8.

In general, systems and methods are provided for controlling a steerable, self-propelled, semiautonomous trailer and lead vehicle which are tethered in such a manner as to allow each vehicle the independent ability to steer and accelerate/decelerate.

In one example, the system includes (i) a module or controller configured to control the behavior of a paired lead vehicle and semiautonomous trailer by interfacing with sensors, signals, and actuators on both vehicles, (ii) a suite of input signals and sensors necessary for the control of the paired lead vehicle and semiautonomous trailer, (iii) an algorithm for determining the optimal orientation and path for the tethered lead vehicle and semiautonomous trailer based on driver control inputs, sensor signals, and pre-programmed routines, and (iv) a means of relaying output signals from the controller to various actuators on the lead and trailer vehicles to execute various forward and reverse towing maneuvers.

In this way, the algorithms and routines described herein are designed to improve the ease and safety of towing a trailer by optimizing the path of travel for the tethered lead and trailer vehicles. The system allows the driver to make intuitive control inputs and translates these inputs into the necessary steering/throttle/brake outputs for both vehicles to achieve the driver's desired path of travel, as described herein in more detail.

Figure 1:
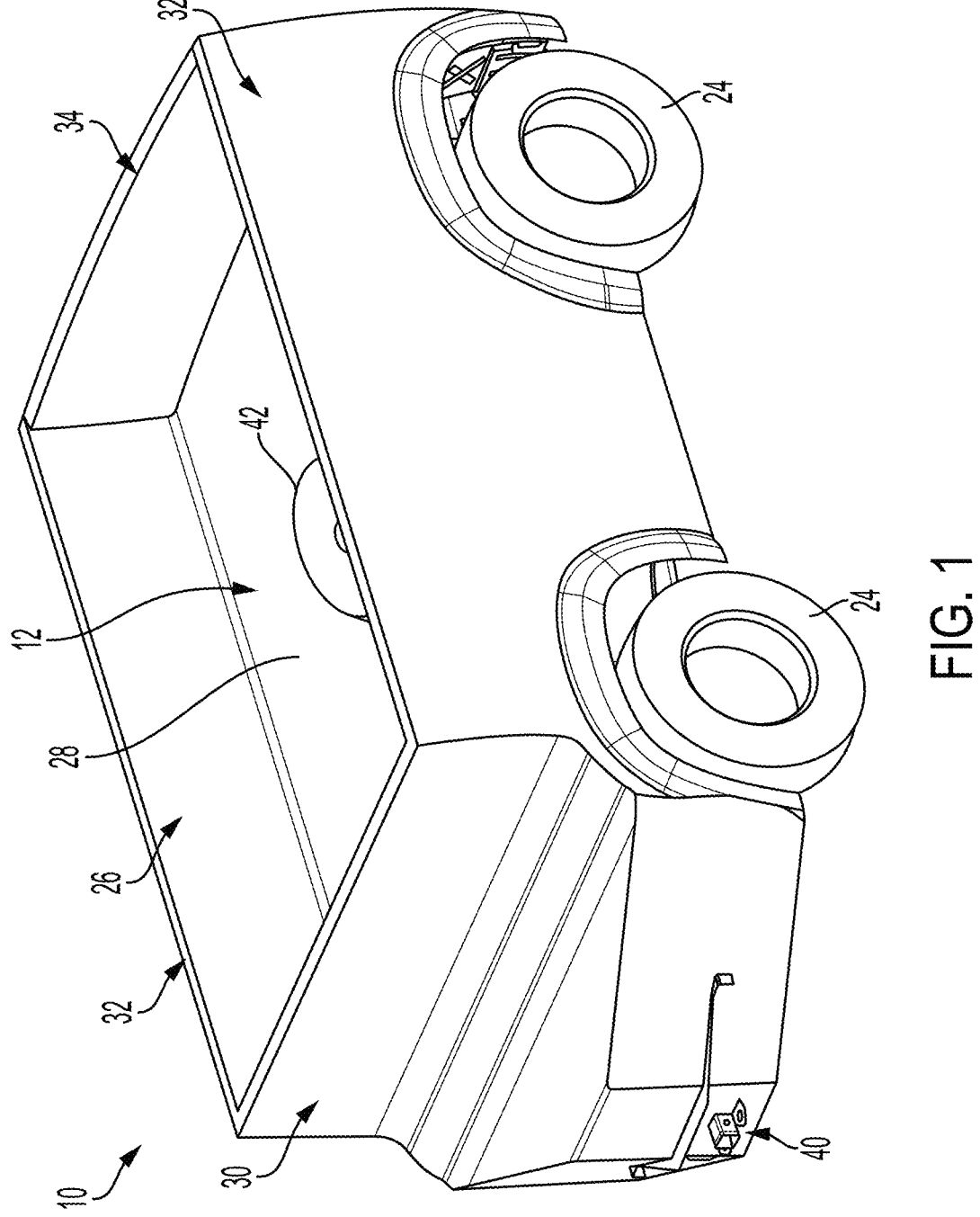
FIG. 1 is a perspective view of an example dolly platform system with independent propulsion and control, in accordance with the principles of the present application.
Figure 2:
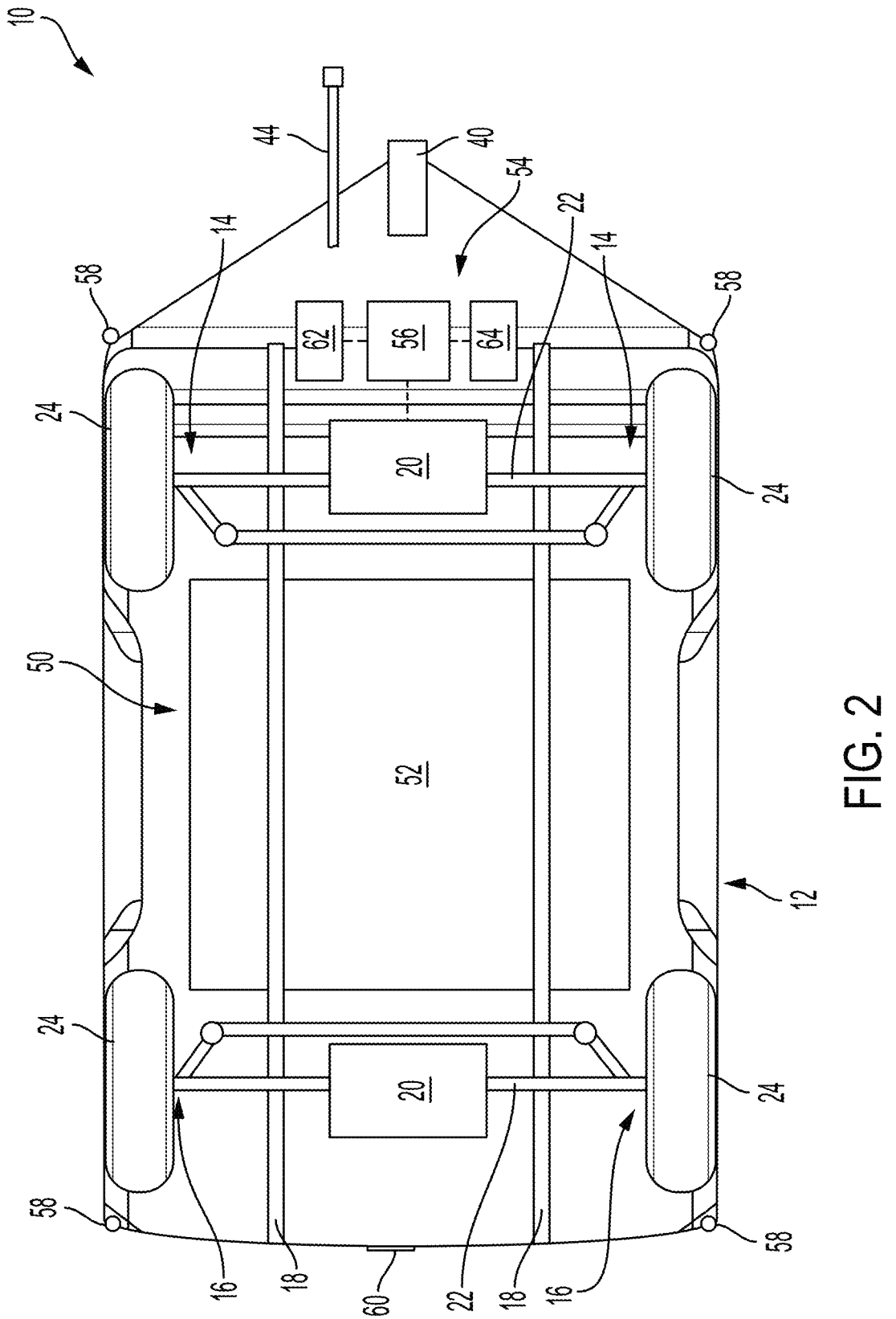
FIG. 2 is a bottom view of the dolly platform system shown in FIG. 1, in accordance with the principles of the present application.

With reference now to FIGS. 1 and 2, the trailer support-ing dolly system with independent propulsion and control will be describe in more detail. In some examples, the trailer-supporting dolly system is an auxiliary power dolly that enables small vehicles to tow a trailer such as a gooseneck, fifth wheel, or traditional bumper-pull trailer. The dolly system provides the motive force and energy needed to tow a trailer via an electrified powertrain and batteries. The dolly system attaches to the lead vehicle via a tow bar and supports heavier loads and taller hitch height of a trailer that is specifically designed for trucks with in-bed connections (e.g., fifth wheel, gooseneck). The dolly system functions as a steering axle for the trailer to control its motion via steer-by-wire, and allows separate low-speed remote maneuvering for parking in confined spaces such as parking lots, campgrounds or charging stations.

The dolly system includes suspension (rate and travel) similar to the rear axle of one-ton DRW trucks or enclosed cargo vans. This provides the dolly system with its own ground force reactions for steering, acceleration, and brak-ing to manage loading into the trailer hitch structure similar to "free pivot" designs. The dolly system can also include modular functionality greater than a pickup truck with a bed. For example, the dolly system can include a dump bed with modular side panels that transition between a flat bed and a walled-in bed depending on the cargo. The walled-in bed can include conventional bed sides/walls and a cover for typical truck bed usage. Because the dolly system can be remotely maneuvered at low speeds, the system is highly maneuver-able for utility uses such as dumping mulch, collecting/moving firewood, waste/dumpster disposal, etc.

In the example embodiments, the dolly system is config-ured to support the weight of any type of trailer hitch and acts as an intermediary between the lead vehicle and the trailer. The intermediate body creates backwards compat-ibility between EVs and older trailers without their own power source. Onboard batteries improve range of the EV/trailer, and allow a smaller lead vehicle to tow a large trailer by handling most or all of the braking and acceler-ating. The front steering axle pulls the trailer around corners and allows it to accurately follow the lead vehicle path. A low-speed remote maneuvering function allows the trailer to steer into tight spaces with ease. The dolly system's truck bed sides and small size allow users to experience the functionality and utility of a truck only when they need it, allowing them to own a smaller, cheaper, and more fuel-efficient vehicle that suits daily use needs.

The dolly system described herein advantageously pro-vides backwards compatibility for EVs to pull older trailers, does not require users to purchase a new trailer in order to maintain towing range, and allows the driver to steer the trailer much more easily than a conventional trailer because of the active steering axle. The system also provides more control than the passive steering axle of an automated safety hitch, and allows a much smaller vehicle to tow/lead the trailer because of the stability of its four-wheeled chassis and electrified powertrain. As such, the dolly system does all the work of braking, accelerating and steering of the trailer, leaving the lead vehicle to simply be a guide.

With continued reference to FIGS. 1 and 2, a trailer-supporting tug/dolly platform system 10 with independent and autonomous propulsion and control is illustrated. The dolly system 10 advantageously provides a non-powered trailer with a powered trailer having autonomous steering capabilities. The dolly system 10 includes a load platform 12 located above and supported by a front suspension 14, a rear suspension 16, and a frame or chassis 18. The dolly system 10 includes an electric powertrain having one or more electric traction motors 20 that generate and transfer torque to one or more steerable axles 22 and wheels 24 via intermediate components (e.g., a transmission, shafts, dif-ferential). The electric traction motor(s) 20 are electrically coupled to and powered by a high voltage battery system 50 having one or more battery packs or modules 52, as described herein in more detail.

In one exemplary implementation, the dolly system 10 is similar to a pickup truck bed, as illustrated. The load platform 12 provides a truck bed or cargo area 26 defined at least partially by a floor 28, a forward wall 30, side walls 32, and a tailgate 34. One or more of the forward wall 30, side walls 32, and tailgate 34 may be removable to transition the dolly system 10 into various configurations for towing and/or cargo hauling. Moreover, the load platform 12 may be articulatable to function as a dump bed.

In the example embodiment, the dolly system 10 includes a lead vehicle hitch connection 40, a trailer hitch structure 42, and a high voltage power connection 44. The lead vehicle hitch connection 40 is configured for removable coupling with a lead vehicle (not shown), for example via the tow bar system 200 described herein. The trailer hitch structure 42 is coupled to the floor 28 and configured to removably couple to a trailer (not shown) such as a fifth wheel or gooseneck trailer. The high voltage power connec-tion 44 is configured to electrically couple to a correspond-ing connection of the lead vehicle (not shown). The high voltage connection 44 is electrically coupled to the battery pack(s) 52 to enable power connection between the dolly system 10 and the lead vehicle. In this way, battery charge can be shared or redirected between the electric dolly system 10 and an electric lead vehicle.

As shown in FIG. 2, the dolly system 10 includes an advanced driver assistance system (ADAS)/autonomous driving system 54 that generally includes a controller 56, one or more sensors 58, one or more cameras 60, a steer-by-wire control module 62, and one or more actuators 64. The controller 56 is configured to control operation of the dolly system 10 as well as execute at least one ADAS/autonomous driving feature. The sensors 58 and cameras 60 are configured to capture/measure data utilized by the ADAS/autonomous driving system 54 to control the dolly system 10. The steer-by-wire control module 62 is config-ured to operate the actuators 64 to control driving/operation of the dolly system 10 as part of the ADAS/autonomous driving feature. In this way, the controller 56 is configured to control the electric traction motor(s) 20 and the steerable axle(s) 22 and can be configured for autonomous or manual control of the dolly system 10. Moreover, the controller 56 or other components (e.g., sensors 58, cameras 60) of the ADAS/autonomous driving system 54 may be in signal communication with the lead vehicle (e.g., via electrical connection, wireless, CAN bus, lead vehicle ADAS system, etc.) for cooperative and integrated operation between the dolly system 10 and lead vehicle.

In operation, the dolly system 10 provides motive force and power to tow a trailer via an electrified powertrain and HV battery system 50, including independently performing some or all braking and acceleration of the trailer. This reduces or eliminates power demands on the towing vehicle for acceleration and braking, which allows a smaller vehicle to tow a larger trailer, since the dolly system 10 can balance itself and is not dependent on the towing vehicle to carry significant trailer tongue weight. The dolly system 10 supports the heavier loads and taller hitch height of a trailer specifically designed for trucks with in-bed connections. Advantageously, the dolly system 10 includes its own suspension 14, 16 to provide its own ground force reactions for steering, acceleration and braking to manage loading in the trailer hitch structure. Moreover, the ADAS/autonomous driving system 54, including the steer-by-wire control module 62, is utilized to control the steering axle(s) 22 to provide and control its own motion of the attached trailer. Additionally, the dolly system 10 can be controlled (e.g., driven) in a low-speed remote maneuvering mode via a control unit (not shown) such as, for example, a user interface in the towing vehicle, a user interface on the dolly system, a smart phone app, etc. This is particularly useful for parking in tight confines such as parking spaces, charging stations, camping sites, etc.

Figures 3, 4:
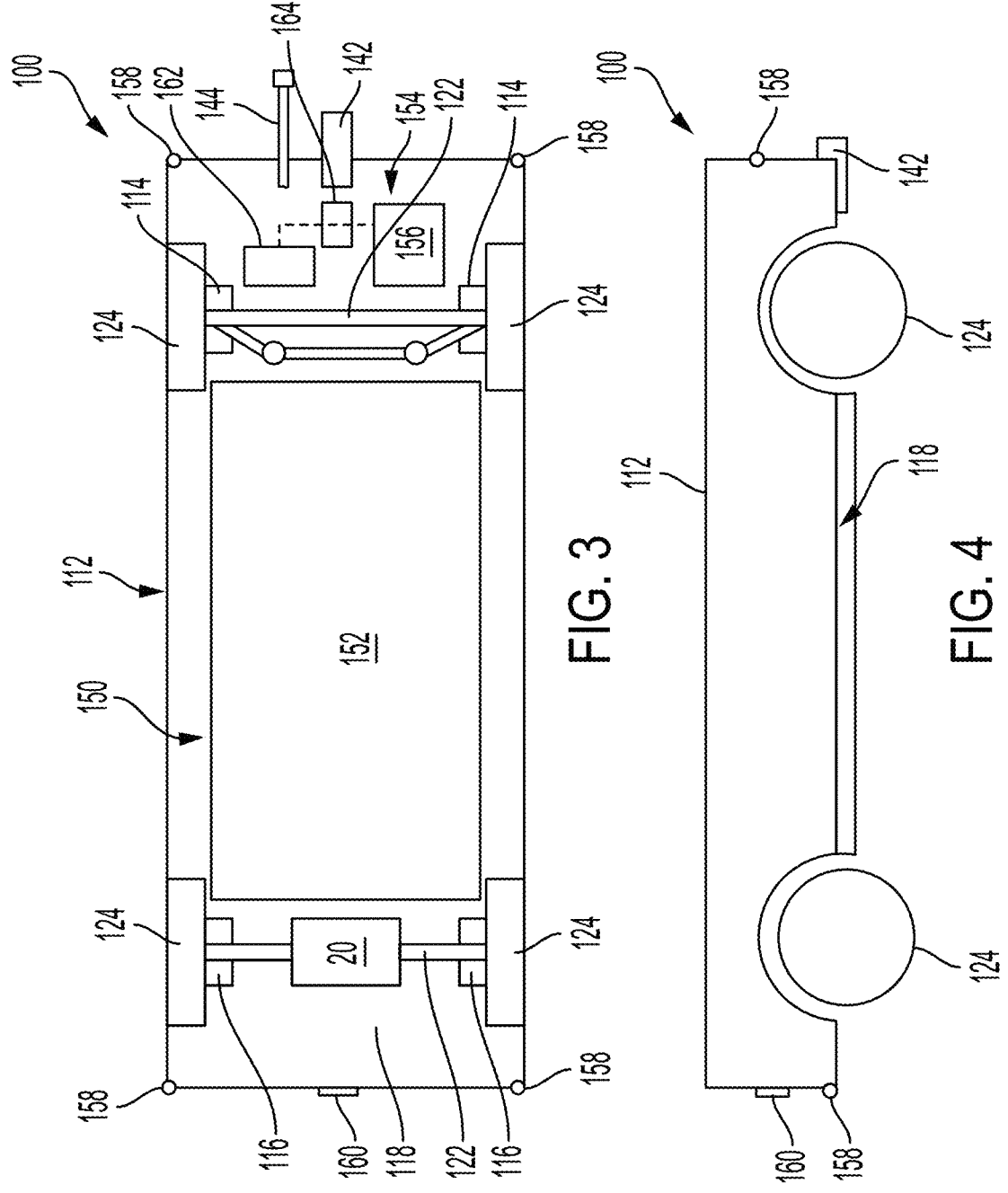
FIG. 3 is a bottom view of an example trailer platform system in accordance with the principles of the present application.
FIG. 4 is a side view of the trailer platform system shown in FIG. 3, in accordance with the principles of the present application.

With reference now to FIGS. 3 and 4, the trailer platform system with independent propulsion and control will be described in more detail. In some examples, the trailer platform system is a self-propelled battery electric vehicle (BEV) based, wagon style (e.g., wheel at four corners) trailer, with autonomous driving control capability. The trailer platform system generally includes a chassis, wheels, tires, suspension, brakes, a battery pack, electric drive motor(s), control modules (e.g., controllers), a steer-by-wire system, camera(s), and/or sensor(s). The system operates by interacting with some or all of the following components on the lead vehicle: vehicle CAN bus, trailer hitch load cell, vehicle dynamics control module(s), and autonomous sensors and ADAS control module(s). The system is also configured to share battery charge between the lead vehicle and the trailer platform.

In the example embodiment, the trailer platform system provides the motive force and energy needed to tow a trailer via an electrified powertrain and batteries. The system attaches to the lead vehicle (e.g., through a wireless or wired connection and a tow bar) and is configured to support its own weight. The trailer includes a steering axle to control its motion via steer-by-wire and allows separate low-speed remote maneuvering. The trailer system includes a suspension (rate and travel) similar to the rear axle of a one-ton DRW truck or enclosed cargo van to provide its own ground force reactions for steering, acceleration and braking, to thereby manage loading and clearance to the lead vehicle. In one example, with a highly autonomous lead vehicle, the lead vehicle can control the trailer remotely to the autonomy level, and associated cost and weight of the trailer can be reduced by eliminating the ADAS sensors and controllers from the trailer.

In some examples, the included battery pack, motor(s), and controller(s) are sized to reduce or eliminate power demands on the lead vehicle for acceleration and braking. The wagon style trailer setup (with wheels at the four corners of the trailer instead of near the middle of the trailer length for traditional towed trailers) will allow a smaller vehicle to tow a larger trailer, since the trailer can balance itself and is not dependent on the lead vehicle to carry significant trailer tongue weight. The dynamic steering and propulsion/braking capability allows the trailer to correct the trailer's path when turning while moving in forward or reverse to follow the lead vehicles intended path more closely than traditional trailers. This can also allow for trailer obstacle avoidance and enhanced trailer stability control.

The trailer platform system advantageously provides autonomous dynamic control (e.g., acceleration, braking, steering) to a trailer, controlled either through self-contained systems or communication with lead vehicle autonomous systems. The wagon-style chassis can be used in light and medium duty trailer categories for on-road use. The actively steered axle allows greater steering control and the ability to reverse as compared to low-speed farm/utility wagons.

With continued reference to FIGS. 3 and 4, a trailer platform system 100 with independent and autonomous propulsion and control is illustrated. The trailer platform system 100 includes a load platform 112 located above and supported by a front suspension 114, a rear suspension 116, and a frame or chassis 118. The trailer platform system 100 includes an electric powertrain having one or more electric traction motors 120 that generate and transfer torque to one or more steerable axles 122 and wheels 124 via intermediate components (e.g., a transmission, shafts, differential). The electric traction motor(s) 120 are electrically coupled to and powered by a high voltage battery system 150 having one or more battery packs or modules 152. As illustrated, in the example embodiment, the wheels 124 are located at the four corners of the trailer instead of near the middle of the trailer length.

In the example embodiment, the trailer platform system 100 includes a lead vehicle hitch connection 142 and a high voltage power connection 144. The hitch connection 142 is coupled to the chassis 118 and is configured for removable coupling with a lead vehicle (not shown), for example via the tow bar system 200 described herein. The high voltage power connection 144 is configured to electrically couple to a corresponding high voltage connection of the lead vehicle (not shown). The high voltage power connection 144 is electrically coupled to the battery pack(s) 152 to enable power connection between the trailer platform system 100 and the lead vehicle. In this way, battery charge can be shared or redirected between the electrically driven trailer platform system 100 and an electric lead vehicle.

As shown in FIG. 3, the trailer platform system 100 includes an advanced driver assistance system (ADAS)/autonomous driving system 154 that generally includes a controller 156 (e.g., PCM), one or more sensors 158, one or more cameras 160, a steer-by-wire control module 162, and one or more actuators 164. The controller 156 is configured to control operation of the trailer platform system 100 as well as execute at least one ADAS/autonomous driving feature. The sensors 158 and cameras 160 are configured to capture/measure data utilized by the ADAS/autonomous driving system 154 to control the trailer platform system 100. The steer-by-wire control module 162 is configured to operate the actuators 164 to control driving/operation of the trailer platform system 100 as part of the ADAS/autonomous driving feature. In this way, the controller 156 is configured to control the electric motor(s) 120 and the steerable axle(s)

122 and can be configured for autonomous or manual control of the trailer platform system 100. Moreover, the controller 156 or other components (e.g., sensors 158, cameras 160) of the ADAS/autonomous driving system 154 may be in signal communication with the lead vehicle (e.g., via electrical connection, wireless connection, CAN bus, lead vehicle ADAS system, etc.) for cooperative and integrated operation between the trailer platform system 100 and lead vehicle.

In operation, the trailer platform system 100 provides motive force and power to tow a trailer via an electrified powertrain and HV battery system 150, including independently performing some or all braking and acceleration of the trailer. This reduces or eliminates power demands on the towing vehicle for acceleration and braking, which allows a smaller vehicle to tow a larger trailer, since the trailer platform system 100 can balance itself and is not dependent on the towing vehicle to carry significant trailer tongue weight. Advantageously, the trailer platform system 100 includes its own suspension 114, 116 to provide its own ground force reactions for steering, acceleration and braking to manage loading in the trailer hitch structure. Moreover, the ADAS/autonomous driving system 154, including the steer-by-wire control module 162, is utilized to control the steering axle(s) 122 to provide and control its own trailer motion. Additionally, the trailer platform system 100 can be controlled (e.g., driven) in a low-speed remote maneuvering mode via a control unit (not shown) such as, for example, a user interface in the towing vehicle, a user interface on the trailer platform system, a smart phone app, etc. This is particularly useful for parking in tight confines such as parking spaces, charging stations, camping sites, etc.

With reference now to FIGS. 5-8, the tow bar system will be described in more detail. In some examples, the tow bar system is configured for independently steered and powered trailers and includes: (a) a five degree of freedom connection at both ends of the tow bar to allow articulation between the two vehicles, (b) a means of adjusting the length of the bar between the lead and follow vehicles, (c) a means of locking the adjusted length after the connection has been made between the vehicles, (d) a means to absorb harsh compressive loads that could occur while braking or steering, (e) a means to absorb harsh tensile loads that could occur while accelerating or steering, (f) a means to support and route an electrical cable connection between the lead and follow vehicles, (g) an optional means to sense angular difference between the tow bar and either one or both lead and follow vehicle, (h) a means of sensing tensile and compressive loads in the tow bar, (i) an optional means to lockout the lateral steering degree of freedom at one end of the tow bar, (j) a length sensing device that includes a free sliding mechanism allowing length changes between the vehicle connections within a defined min and max distance between the lead and follow vehicles, and/or (k) a length sensor for sensing the extended length of the tow bar to provide distance and velocity/acceleration rate of change status information to the vehicle control systems. The mechanical assembly is configured to attach between the rear trailer towing connection of the lead vehicle and a front/center towing connection like a typical rear towing connection.

The tow bar system provides a physical linkage between two vehicles that have the independent ability to accelerate and decelerate (fore/aft) via human or autonomous control, and steer laterally via human or autonomous driving control. The system provides additional degrees of freedom as a link between the two vehicles to allow improved articulation between the leading and following vehicles, leaving only a tension/compression load and nominal length constraint. The system does not support vertical loading between the two vehicles, so no weight is transferred therebetween and having a negative effect on the handling of them individually or as a pair. The system also does not transfer lateral moment loading between the vehicles unless a tensile or compressive load is created by a speed differential between the vehicle attachment points. This feature will eliminate any possibility of the following vehicle imparting trailer sway to the lead vehicle, and allow the lead and follow vehicles to maintain an offset within the lane width when it may be advantageous for crosswind drag or visibility in outside lanes. As such, the tow bar system allows vehicles that may be mismatched in terms of turning radius (e.g., due to differences in wheelbase) to follow in a best fit path via independent physical, but electronically linked steering, acceleration, and braking controls.

Additionally, the tow bar system advantageously provides one or more of the following optional benefits over conventional trailer attachment: (a) additional angular tolerance for the connection eliminates the need for jacking or height adjustments on flat or angled ground; (b) optional selectable length adjustment combined with feature (a) eliminates the need for a precise distance between the two vehicles; (c) once the mechanical connections have been made the nominal length will be set and locked at the bar, or by moving one of the vehicles to the next locking point; (d) allowing for some compression travel within the tow bar will allow for latency between the lead vehicle initiating a braking event before the following vehicle can respond precisely. A relatively small amount of compressive travel will reduce the load on the tow bar and any shock or bump that might be felt by the vehicle occupants; (e) allowing some extension travel provides the same benefits as feature (d) for acceleration and can also be used if it is desirable for the following vehicle to have a higher braking power to keep the connection in-line with the lead vehicle; (f) the structure of the tow bar can serve as a support for communications and power transfer harnesses between the lead and follow vehicles, though a wired connection may not be required if wireless technology is used; (g) optional measurement of the angle of the tow bar to the lead and follow vehicles could be used as a primary or back-up sensing to the onboard electronics of the lead and/or follow vehicles, while sensing angle directly at the tow bar can prevent jackknife/contact events while making low speed maneuvers in forward or reverse; (h) sensing the tensile and compressive loading present in the tow bar can provide a primary or secondary means of balancing or targeting a desired force during acceleration, cruising at steady speed and braking forces between the two vehicles; and (i) optional ability to lock the lateral pivoting of the tow bar at one end, which allows for the recovery of a following vehicle that may not have lost electrical power to maintain its independent steering operation or may have reduced braking performance. The lock could be set manually or while driving if a loss of power or function is detected.

In some examples, the tow bar system advantageously provides: spherical degrees of freedom at both ends of the tow bar, which allows active steering of the trailing vehicle, as opposed to flat towing where the front wheels of the tow vehicle must follow the path dictated by a rigid tow bar. The system also includes a powered trailer, which allows reversing maneuvers that are not possible with flat towing. Steering of the trailer is controlled electronically, allowing reverse movement without jackknifing, and left-right bias relative to the lead vehicle. The system supplies all or most of the pulling power needed to move the trailer with any lead vehicle, as enabled by a load cell in the tow bar. The system is a simply supported beam connection so the lead vehicle does not have to support the trailer's weight.

Figures 5, 6:
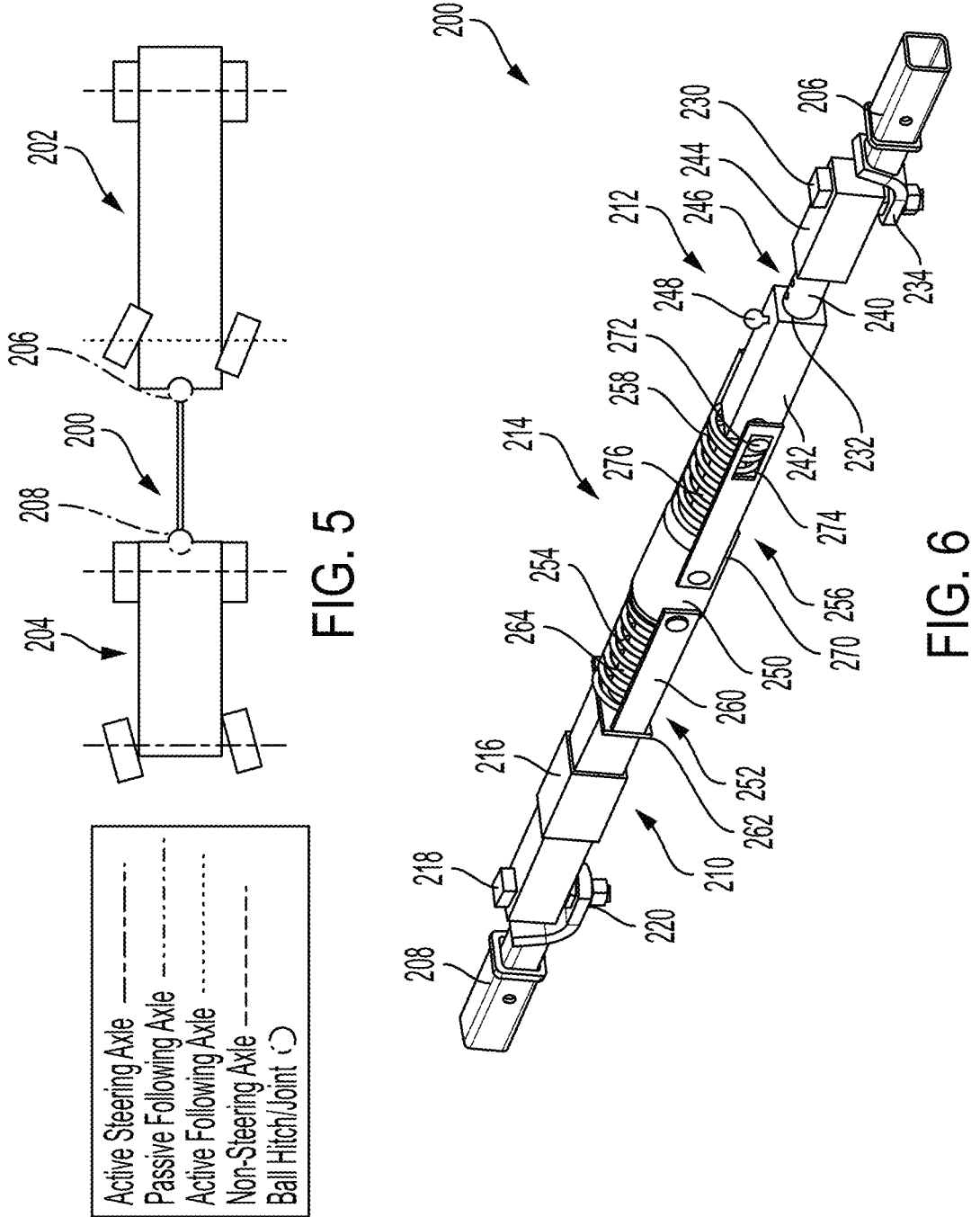
FIG. 5 is a schematic illustration of an example tow bar system connecting a lead vehicle and a trailing vehicle, in accordance with the principles of the present application.
FIG. 6 is a perspective view of the example tow bar system shown in FIG. 5, in accordance with the principles of the present application.

With continued reference to FIGS. 5-8, a tow bar system 200 for independently steered and powered trailers is illustrated. As shown in FIG. 5, the tow bar system 200 is configured to removably couple a trailing vehicle 202 (e.g., a trailer) to a lead vehicle 204. The trailing vehicle 202 includes a hitch receiver 206, and the lead vehicle includes a hitch receiver 208. As shown in FIG. 6, the tow bar system 200 generally includes a front tow bar 210 and a rear tow bar 212 coupled by a damper system 214. The tow bar system 200 is configured to support and route an electrical cable connection (not shown) between the lead and follow/tow vehicles, for example to provide signal communication (e.g., from sensors, cameras, etc.) or shared high voltage therebetween.

In the example embodiment, the front tow bar 210 is configured to removably couple to a hitch 220 received by the lead vehicle hitch receiver 208. As illustrated, the front tow bar 210 includes a load cell 216 and an angle sensor 218. The load cell 216 is configured to sense various forces on the tow bar system 200 including a trailer tongue weight, tension, and compression. The angle sensor 218 is configured to sense an angle between the lead vehicle 204 and a longitudinal axis of the front tow bar 210. The load cell 216 and the angle sensor 218 are in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the load cell 216 and angle sensor 218 to control one or more operations of the vehicles 202, 204.

The rear tow bar 212 is configured to removably couple to a hitch 234 received by the trailing vehicle hitch receiver 206. The rear tow bar 212 includes an angle sensor 230 and a length adjustment and locking mechanism 232. The angle sensor 230 is configured to sense an angle between the trailing vehicle 202 and the longitudinal axis of the rear tow bar 212. The angle sensor 230 is in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the angle sensor 230 to control one or more operations of the vehicles 202, 204.

In the example embodiment, the length adjustment and locking mechanism 232 generally includes a locking bar 240 extending between a forward bar 242 and a rearward bar 244. The locking bar 240 is rigidly coupled to the rearward bar 244 and is slidingly received within the forward bar 242. The locking bar 240 includes a plurality of axially spaced apertures 246 configured to selectively receive a pin 248 therein to lock-in the relative distance between the forward bar 242 and the rearward bar 244. The pin 248 is removable to allow sliding adjustment of the locking bar 240 to establish a desired length of the rear tow bar 212. It will be appreciated however that rear tow bar 212 may have any suitable alternative configuration that enables length adjustment of the rear tow bar 212, and such a length adjustment system may additionally or alternatively be utilized with the front tow bar 210.

In the example implementation, the damper system 214 is disposed between the front tow bar 210 and the rear tow bar 212 and generally includes a damper 250, a front support 252, a front biasing mechanism 254 (e.g., a spring), a rear support 256, and a rear biasing mechanism 258 (e.g., a spring).

The front support 252 includes a pair of spaced apart support bars or members 260 with first ends coupled to an end plate 262, and opposite second ends coupled to the damper 250. The end plate 262 is coupled to and/or disposed against the front tow bar 210. The front biasing mechanism 254 is disposed about a front guide post 264 and positioned between the end plate 262 and the damper 250. The front guide post 264 is integral with or rigidly coupled to the front tow bar 210 and extends through an aperture formed in the end plate 262. In one example embodiment, the front biasing mechanism 254 is an extension spring configured to bias the front tow bar 210 and damper 250 towards each other, and absorb tensile forces in the tow bar system 200. The damper 250 is a generally cylindrical damping member fabricated from a suitable damping material configured to absorb forces (e.g., tension, compression) experienced in the tow bar system 200 during towing operations.

The rear support 256 includes a pair of spaced apart support bars or members 270 with first ends coupled to the damper 250, and opposite second ends coupled to the rear tow bar 212, for example, via the illustrated pins 272. The second end of each support member 270 includes a window 274 configured to slidingly receive pin 272. In this way, pins 272 are configured to translate fore/aft within the windows 274. The rear biasing mechanism 258 is disposed about a rear guide post 276 and positioned between the damper 250 and the rear tow bar 212. The rear guide post 276 is integral with or rigidly coupled to the rear tow bar 212. In one example embodiment, the rear biasing mechanism 258 is a compression spring configured to bias apart the damper 250 and rear tow bar 212 and absorb compressive forces in the tow bar system 200.

Figure 7:
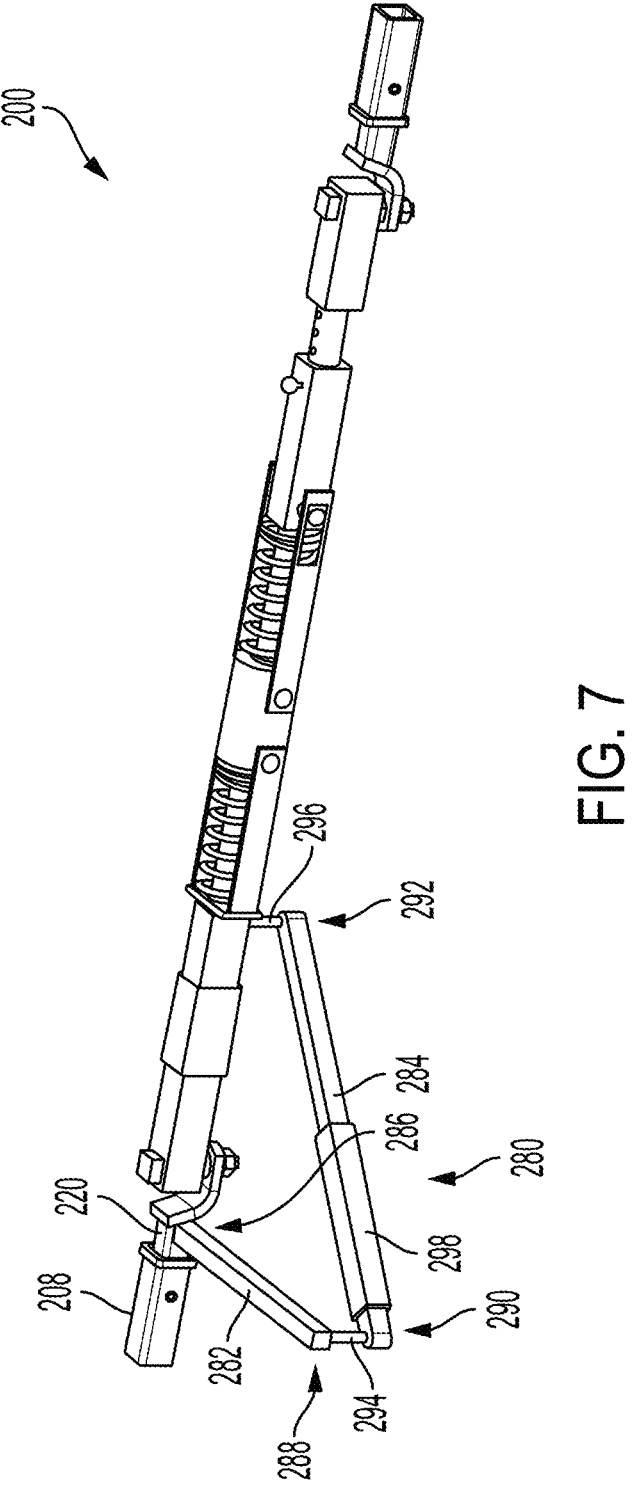
FIG. 7 is a perspective view of the example tow bar system shown in FIG. 6 with an example horizontal lockout assembly, in accordance with the principles of the present application.

FIG. 7 illustrates the tow bar system 200 with a horizontal lockout assembly 280 configured to lock out the lateral steering degree of freedom at one end of the tow bar if steering control is lost on the trailing vehicle 202. In this way, the horizontal lockout assembly 280 is configured to turn the tow bar system 200 into a rigid tow bar to prevent loss of lateral control.

In the example embodiment, the horizontal lockout assembly 280 generally includes a horizontal bar or member 282 and an angled bar or member 284. The horizontal member 282 includes a first end 286 coupled to the hitch 220 and an opposite second end 288. The angled member 284 includes a first end 290 and an opposite second end 292. The first end 290 is pivotally coupled to the horizontal member second end 288 via a pin 294, and the second end 292 is pivotally coupled to the front tow bar 210 via a pin 296. The angled member 284 includes a sliding joint 298 that enables a length of the angled member 284 to change to allow a full range of articulation of the tow bar system 200. If there is a loss of power and/or communication with the trailing vehicle 202, the sliding joint 298 is configured to lock and prevent loss of lateral control of the trailing vehicle 202.

In operation, the tow bar system 200 is configured to absorb harsh tensile and compressive loads that occur while steering, braking, and accelerating. Moreover, the length of tow bar system 200 is adjustable via the length adjustment and locking mechanism 232. The various sensors included with tow bar system 200 enable sensing of tensile/compressive loads as well as the angular difference between the tow bar and the lead and follow vehicles. This enables a self-powered, steering capable follow vehicle (e.g., dolly system 10, trailer platform system 100) to accelerate/decelerate, brake, and steer via human or autonomous control. As such, the tow bar system 200 enables a vehicle/trailer that may be mismatched in terms of turning radius to follow in a best fit path via independent physical, electronically linked steering, acceleration, and braking controls.

Figure 8:
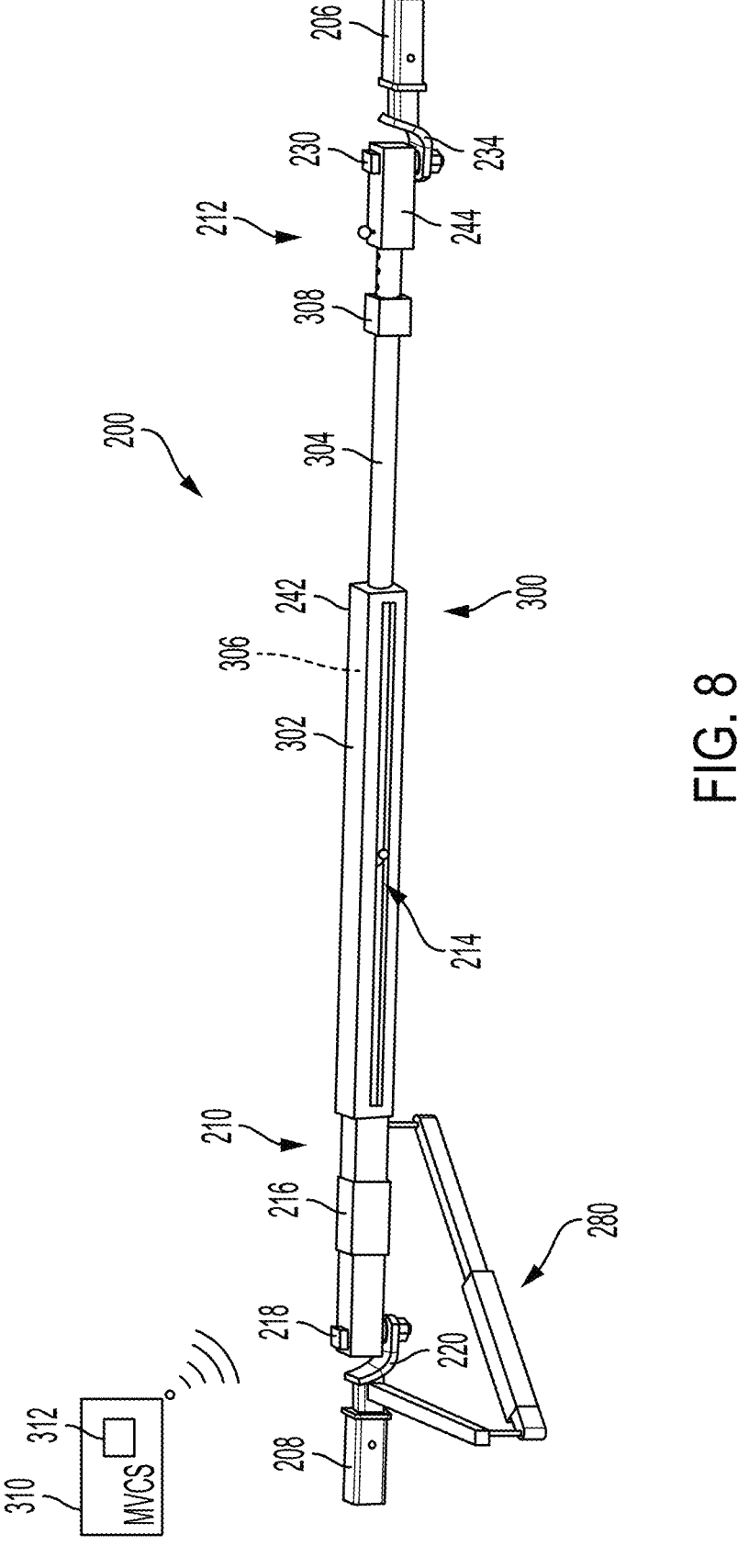
FIG. 8 is a perspective view of another example tow bar system, in accordance with the principles of the present application.

FIG. 8 illustrates the tow bar system 200 with an additional length sensing hitch 300 configured to sense the length of the tow bar and provide distance and derivative status information to dynamic control systems of the lead vehicle 204 and/or the trailing vehicle 202. In one example, the derivative status information includes a rate of change of the velocity and/or acceleration of the individual vehicles 202, 204 or the entire multi-vehicle system.

In the example embodiment, the length sensing hitch 300 generally includes a length sensor housing 302, an extension bar 304, and a length sensor 306. The length sensor housing 302 is configured to house the length sensor 306 and any desired additional components such as, in the illustrated example, the damper system 214. The extension bar 304 is a free-sliding bar that allows opposite attachment ends of the tow bar system to move towards or apart from each other.

In the illustrated example, the extension bar 304 is a free-sliding, extendible/translatable bar disposed between the forward bar 242 (shown disposed within housing 302) and an intermediate bar 308 (or rearward bar 244). The extension bar 304 is rigidly coupled to the intermediate bar 308 and is slidingly (e.g., telescopically) received within the forward bar 242. In some examples, the extension bar 304 may allow a significant amount of extension or compression (e.g., 1.0 to 1.5 meters) to facilitate preventing any acceleration or braking forces from being transferred between the two vehicles 202, 204. Additionally, to accommodate this particular arrangement, the locking mechanism 232 is reversed and the locking bar 240 is rigidly coupled to the intermediate bar 308 and slidingly received within the rearward bar 244.

The length sensor 306 is configured to sense a distance of extension of the extension bar 304 relative to the forward bar 242. While not limited to any particular device, examples of the length sensor 306 include a linear potentiometer, a linear encoder, or a set of rack and pinion gears operably associated with a rotary encoder. In this way, the length sensor 306 is configured to monitor a varying length of the tow bar system 200 between the trailing and lead vehicles 202, 204 during operation.

In some embodiments, the relative acceleration between the lead vehicle 204 and the trailer 202 is determined by measuring the tensile or compressive force on the tow bar via load cell 216. In other embodiments, the relative velocity and/or acceleration are determined by measuring the length of the sliding connection at multiple points in time via length sensor 306. As such, the relative velocity/acceleration between the two vehicles 202, 204 is determined by monitoring the amount of extension or compression of the tow bar. Although FIG. 8 illustrates the inclusion of load cell 216, it will be appreciated that length sensing hitch 300 may be utilized in place of, or in addition to, load cell 216.

The tow bar system 200 may be in signal communication with and part of a multi-vehicle control system (MVCS) 310 such as that described in commonly owned, co-pending U.S. patent application Ser. No. 18/190,588, filed on Mar. 27, 2023, U.S. patent application Ser. No. 18/308,836, filed on Apr. 28, 2023, and U.S. patent application Ser. No. 18/679,794, filed on May 31, 2024, the contents of which are incorporated herein in their entirety by reference thereto. In general, the MVCS 310 includes one or more controllers 312 configured to receive various inputs such as, for example, tow bar system inputs, driver control inputs, inputs from various ADAS sensors, pre-programmed preferences and settings, or inputs from other sources.

The MVCS 310 may utilize or include the one or more controllers (including controllers of vehicle 202, 204) to receive the one or more signals and execute one or more algorithms to provide the desired multi-vehicle control response to improve all aspects of the multi-vehicle system dynamic performance including steering, braking, acceleration, reversing maneuvers, and additional ADAS/autonomous function. Based on the received inputs, the MVCS 310 constructs output(s) to optimize performance of the multi-vehicle system, which includes the tow bar system 200, trailer vehicle 202, and lead vehicle 204. In this way, the MVCS 310 treats the multiple vehicles as separate, but dynamically connected bodies, and translates driver inputs into optimal full-system performance.

With reference now to FIGS. 9-17, example methods of dynamic control of the multi-vehicle system 200, 202, 204 are described in more detail. In general, the MVCS 310 includes control algorithms/software to control the independently powered and steered lead and trailer vehicles 202, 204 connected by the sliding tow bar system 200 (FIG. 8). This tether provides a physical linkage between the two vehicles, but allows the independent ability to steer and accelerate/decelerate via human or autonomous control.

The additional degree of freedom between the two vehicles allows improved articulation between the lead and trailer vehicles. The sliding tow bar system 200 allows a free sliding length of travel to sense the distance between the lead and trailer vehicles, which is then utilized as an input for MVCS 310. The tow bar system 200 does not support vertical loading between the two vehicles, so weight is not transferred therebetween, which could otherwise have a negative effect on vehicle handling. Under normal operating conditions, the tow bar system 200 does not transfer lateral moment loading between the vehicles, thereby eliminating any possibility of the trailer vehicle imparting trailer sway to the lead vehicle. This feature also allows the lead and trailer vehicles to maintain an offset within the lane width when conditions may be disadvantageous for crosswind drag or visibility in outside lanes.

The addition of a second ball connection at the trailer side of the tow bar system 200 allows the lead vehicle to make tighter steering inputs than longer-wheelbase trailers. The system is configured to inform the driver if they are turning too tightly for the trailer to follow using "soft stops" felt as feedback from the electric power steering (EPS) system, which the driver may choose to override. If a jackknife scenario is imminent as detected by the rear angle sensor 230, the MVCS 310 will provide the driver with progressive warnings.

The functional distance between the two vehicles (e.g., the target length of the sliding tow bar while in motion) will be set by the MVCS operating parameters and will be varied based on conditions including, but not limited to; ground speed, radius of turning maneuver in process, lane bias selection, road load work sharing while accelerating, braking, or traveling at a matched speed. This operating position and the resulting amount of free travel may allow for both compression travel and extension travel within the tow bar system 200. The compression travel permits response latency between the lead vehicle initiating a braking event before the trailer vehicle can respond precisely (particularly at high speeds). The extension travel permits response latency between the lead vehicle initiating an acceleration or high angle turning event before the trailer vehicle can respond precisely (particularly at low speeds).

Figure 14:
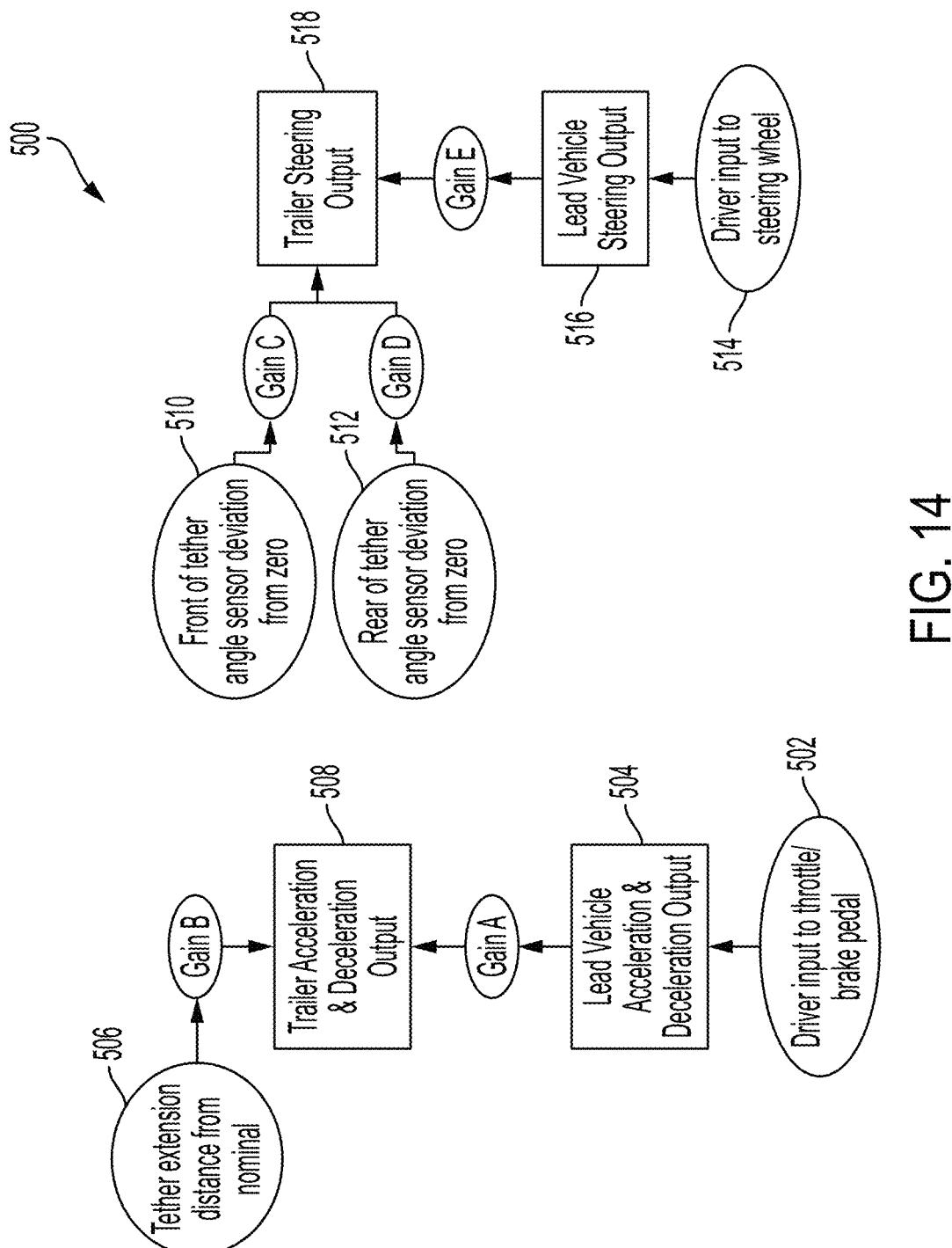
FIGS. 14-15 illustrate functional block diagrams of an example control architecture of a multi-vehicle control system during a high-speed forward driving scenario, in accordance with the principles of the present application.
Figure 15:
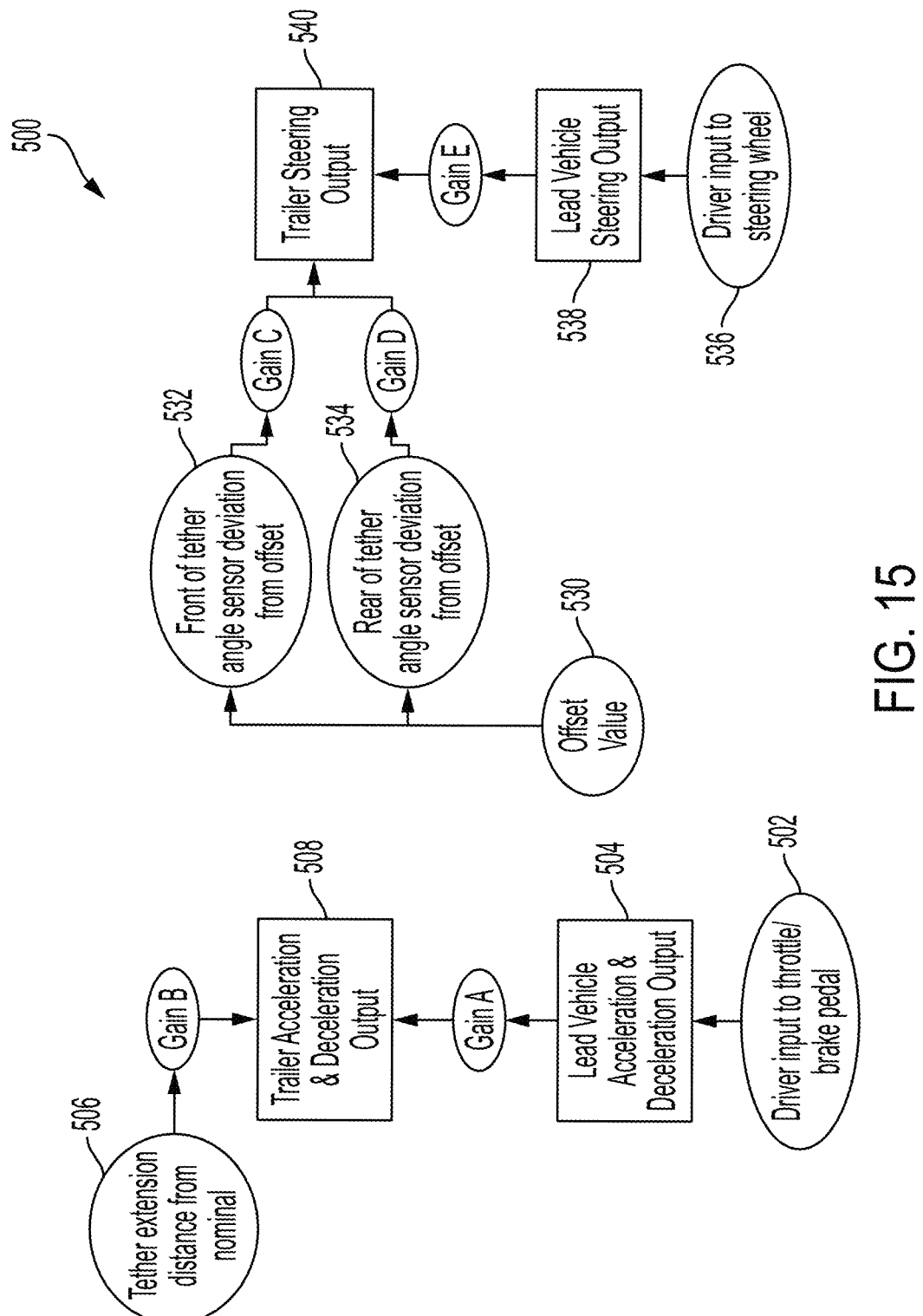
Figure 16:
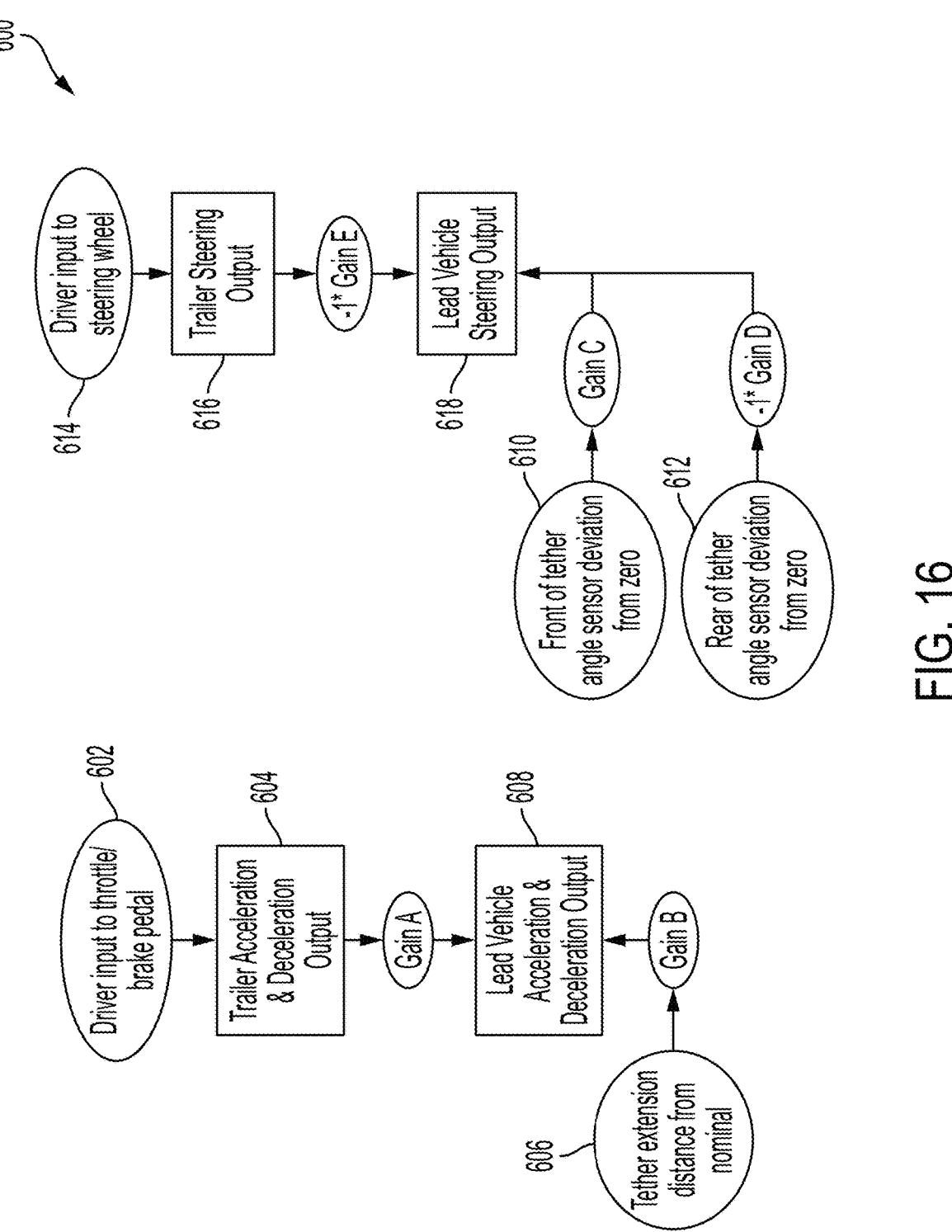
FIGS. 16-17 illustrate functional block diagrams of an example control architecture of a multi-vehicle control system during a low-speed reverse driving scenario, in accordance with the principles of the present application.
Figure 17:
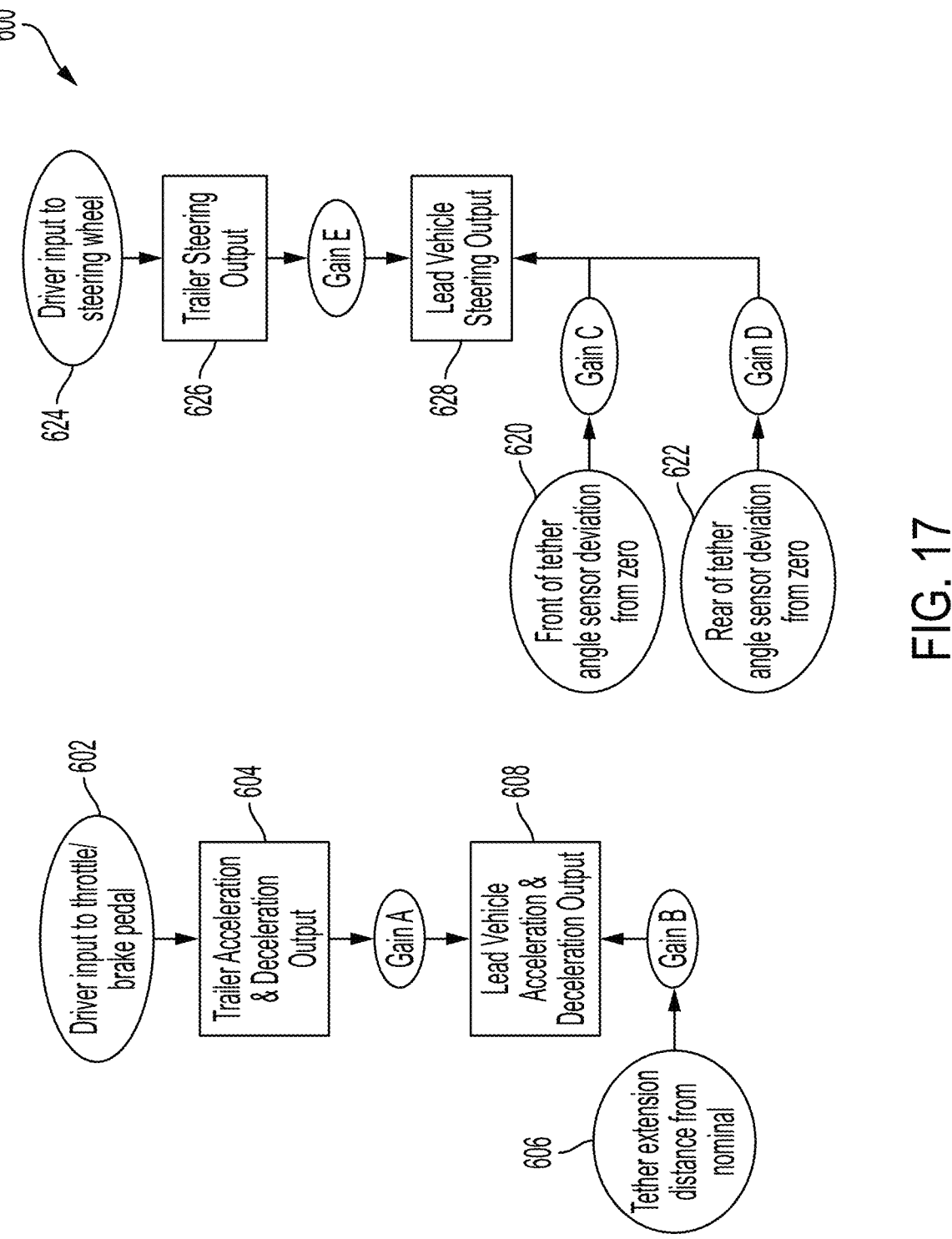

In the example implementation, the MVCS 310 employs specific control algorithms to control the lead vehicle and trailer vehicle, tethered by the sliding tow bar system 200 (FIG. 8), based on a particular driving scenario. Example driving scenarios include a (i) low-speed forward driving scenario, (ii) a high-speed forward driving scenario, and (iii) a slow-speed reverse driving scenario. FIGS. 9-13 illustrate example operational control and capability during the low-speed forward driving scenario. FIGS. 14-15 illustrate example operational control and capability during the high-speed forward driving scenario. FIGS. 16-17 illustrate example operational control and capability during the low-speed reverse driving scenario.

Turning now to FIGS. 9-13, an example architecture 400 for MVCS 310 is illustrated showing operational capability and control of the lead vehicle 204 and trailer vehicle 202 during the low-speed forward driving scenario. In this scenario, the behavior of the multi-vehicle system is tuned to allow tight maneuvering, with the path of the trailer vehicle 202 optimized to follow the lead vehicle 204. Specific operational methods are described in the following.

Figure 9:
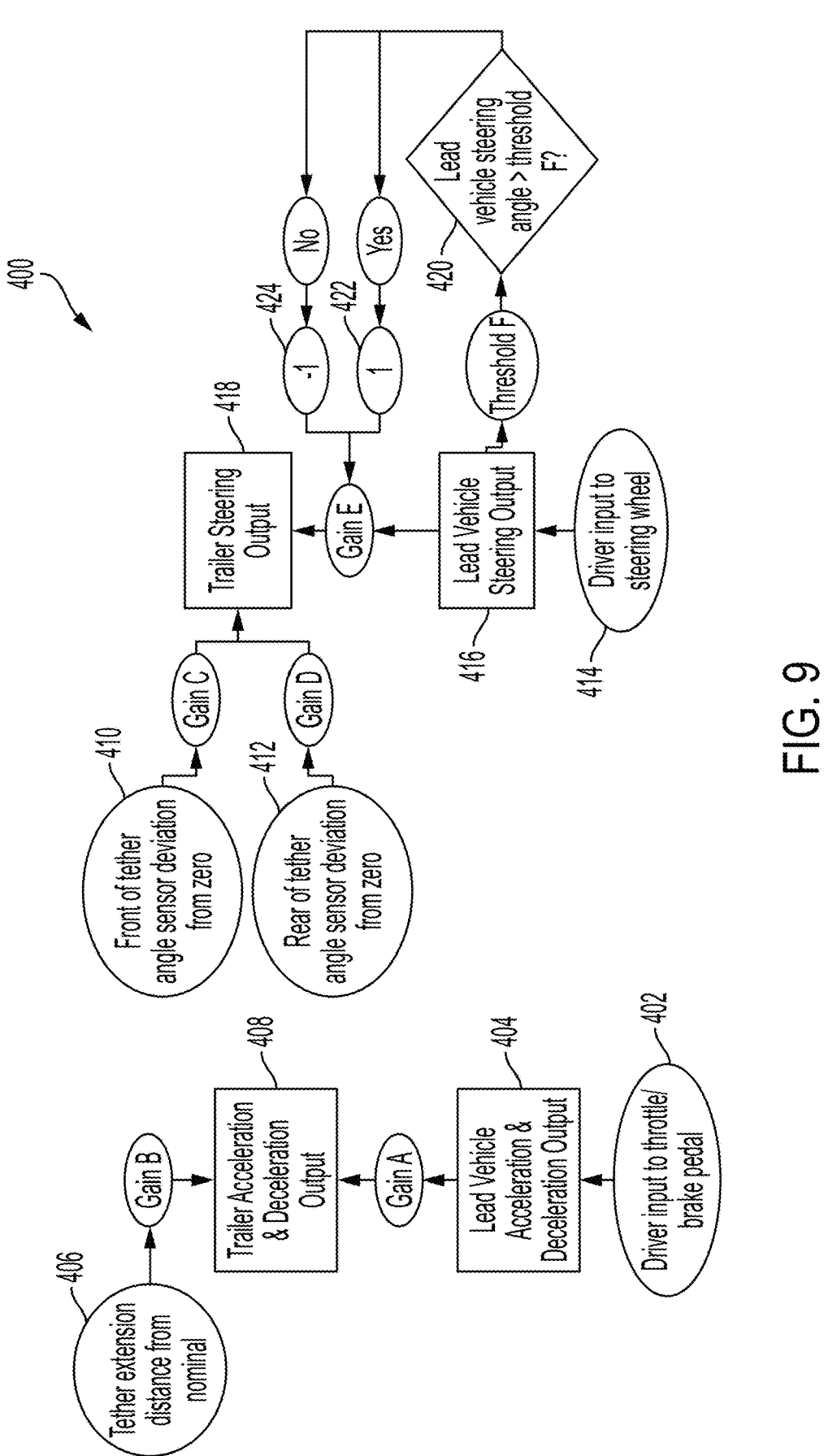
FIGS. 9-13 illustrate functional block diagrams of an example control architecture of a multi-vehicle control system during a low-speed forward driving scenario, in accordance with the principles of the present application.

FIG. 9 illustrates a "basic following" operation with the trailer vehicle 202 following the lead vehicle 204 during a turning maneuver. This turning algorithm/operation may be initiated by monitoring and detecting a turn signal of the lead vehicle 204. In this operation, the MVCS 310 ("control") is configured to determine a trailer acceleration/deceleration output and a trailer steering output based on driver input and sensor readings from tow bar system 200.

At 402, the driver provides input to the throttle or brake pedal. At 404, control provides a lead vehicle acceleration or deceleration output and multiplies the output by Gain A. In the example embodiment, the 'Gain' is a controller gain, which defines the strength of the controller response experienced in relation to a deviation between the input and output signal. In a control loop, the controller gain is the strength of action a controller will take at a particular point above or below a setpoint. The 'Gain' is a scalar multiple, where a reading value is received from a sensor, the value is multiplied by the gain, and results in an output. The actual value of gain is variable and will be determined based on the specific dimensions/calibration of the physical lead vehicle 204 and trailer vehicle 202.

At 406, control determines a tether extension distance from nominal of the extension bar 304 of tow bar system 200. The tether extension distance is multiplied by a Gain B. At 408, control determines the trailer acceleration/deceleration output based on a sum of the lead vehicle throttle/brake multiplied by Gain A and the tether extension distance multiplied by Gain B.

At 410, control determines a deviation from zero of the front angle sensor 218, which is multiplied by a Gain C and utilized at box 418. At 412, control determines a deviation from zero of the rear angle sensor 230, which is multiplied by a Gain D and utilized at box 418. At 414, the driver provides input to the steering wheel of the lead vehicle 204. At 416, control provides a lead vehicle steering output based on the driver input (e.g., via a steering wheel angle sensor). This output is multiplied by Gain E and utilized at box 418.

At 418, control determines the trailer steering output based on a sum of the front tether angle deviation multiplied by Gain C, the rear tether angle deviation multiplied by Gain D, and the lead vehicle steering angle multiplied by Gain E.

In some examples, control is adjusted based on a vehicle steering angle Threshold F. At 420, control determines if the lead vehicle steering output 416 is greater than the predetermined Threshold F. If yes, at 422, control applies a positive coefficient '1' to Gain E to thereby direct the trailer vehicle to turn in the same direction as the lead vehicle. This occurs as the turn becomes tighter. If no, at 424, control applies a negative coefficient '−1' to Gain E to thereby direct the trailer vehicle to turn in the opposite direction of the lead vehicle. This occurs as the turn becomes shallower.

In this operation, the nominal length of the tow bar system 200 is set to a closer following distance (e.g., minimum extension) to preserve a large amount of relative extension if needed for a tight turning maneuver. Here, it is unlikely that an unexpected deceleration by the lead vehicle 204 will occur and/or the forces incurred between the lead and trailer vehicles would disrupt their intended operation.

If the lead vehicle 204 makes a tight turn (above Threshold F) without first signaling the turn, the trailer vehicle 202 will attempt to follow the lead vehicle path by inducing a slight bias toward the outside of the turn. As such, the MVCS 310 monitors for a lead vehicle turn signal to trigger a specific algorithm for deep staging into tight corners. This algorithm allows the trailer vehicle 202 to follow the best possible path of travel.

Figure 10:
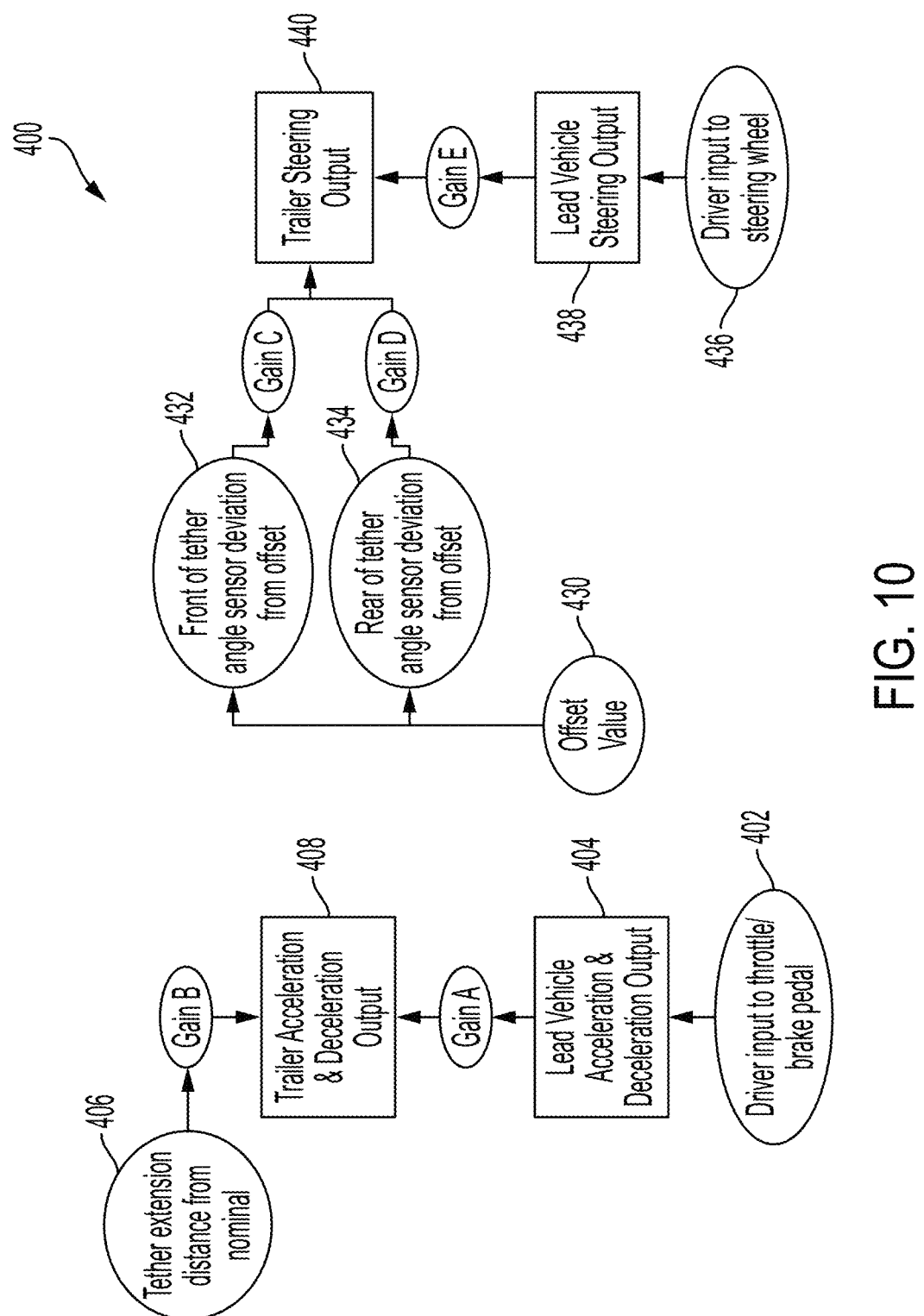

FIG. 10 illustrates a "pre-turn offset" or "staging before a turn" operation with the trailer vehicle 202 horizontally offsetting from behind the lead vehicle 204 prior to a turning maneuver. This turning algorithm/operation may be initiated by monitoring the lead vehicle steering to exceed a predetermined threshold value that indicates entry into a turn. In this operation, the MVCS 310 is configured to determine a trailer acceleration/deceleration output and a trailer steering output based on driver input and sensor readings from tow bar system 200.

In this operation, MVCS 310 is configured to determine the trailer acceleration/deceleration in a manner similar to that described in FIG. 9, as shown by the same reference numerals.

At 430, control determines/provides a predetermined Offset Value for the particular combination of parameters (e.g., size, weight, etc.) for the multi-vehicle system. At 432, control determines a deviation from the Offset Value of the front angle sensor 218, which is multiplied by a Gain C and utilized at box 440. At 434, control determines a deviation from the offset value of the rear angle sensor 230, which is multiplied by a Gain D and utilized at box 440. At 436, the driver provides input to the steering wheel of the lead vehicle 204. At 438, control provides a lead vehicle steering output based on the driver input (e.g., via a steering wheel angle sensor). This output is multiplied by Gain E and utilized at box 440.

At 440, control determines the trailer steering output based on a sum of the front tether angle deviation multiplied by Gain C, the rear tether angle deviation multiplied by Gain D, and the lead vehicle steering angle multiplied by Gain E.

In this operation, the Offset Value is such that the trailer vehicle 202 biases horizontally from the lead vehicle 204 opposite of the direction of the intended turn, but remains within its lane of travel. This may require input from a lane-sensing camera system (not shown) to avoid excursion into another lane. The nominal length of the tow bar 200 is set to the closest possible (minimum) following distance to preserve the maximum relative extension for the upcoming tight turning maneuver. The MVCS 310 monitors for the lead vehicle steering angle to exceed a threshold value to signal that the turn has begun and to then begin a new phase of operation.

Figure 11:
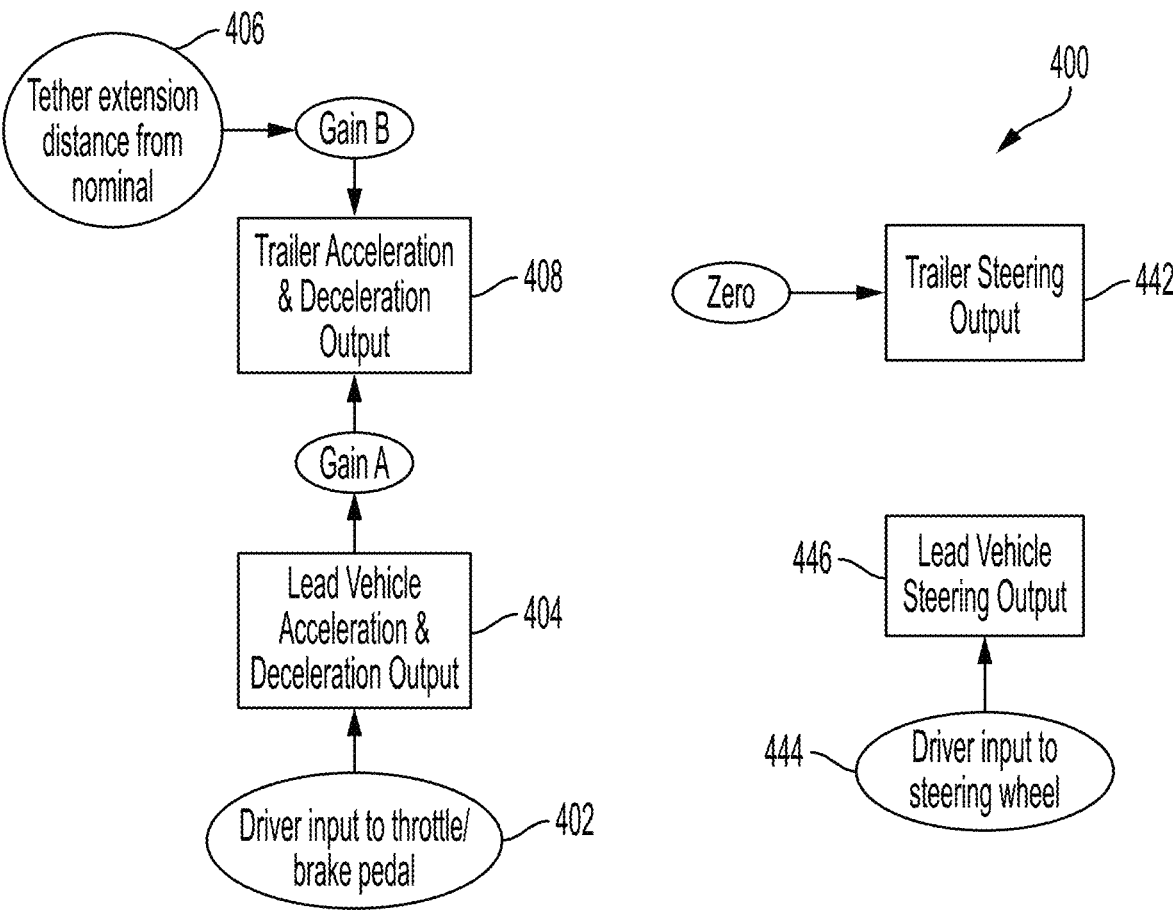

FIG. 11 illustrates a "deep staging into turn" operation where the trailer vehicle 202 initially maintains its direction, while the lead vehicle 204 begins its turning maneuver, before then beginning its own turn. This operation is utilized, for example, when the trailer vehicle 202 is much larger/longer than the lead vehicle 204. This turning algorithm/operation may be initiated by monitoring trailer wheel speed sensors (not shown) to determine when the trailer vehicle 202 has reached an optimal point to begin the turn (e.g., to avoid obstacles, other lanes, etc.), as well as monitoring for jackknife conditions to begin the turn. In this operation, MVCS 310 is configured to determine a trailer acceleration/deceleration output and a trailer steering output based on driver input and sensor readings.

In this operation, MVCS 310 is configured to determine the trailer acceleration/deceleration in a manner similar to that described in FIG. 9, as indicated by the same reference numerals. At 442, control sets the trailer steering output to zero. At 444, the driver provides input to the steering wheel of the lead vehicle 204. At 446, control provides a lead vehicle steering output based on the driver input (e.g., via a steering wheel angle sensor).

In this operation, the length of the tow bar 200 is allowed to increase, eventually reaching its maximum value as the lead vehicle 204 initiates turning and the trailer vehicle 202 remains pointed straight. The MVCS 310 monitors the trailer vehicle wheel speed sensors to detect when the trailer vehicle 202 has traveled an optimal distance into the intersection to initiate its own turn. The MVCS 310 also monitors the angle between the rear of the tow bar 200 and the trailer vehicle 202 (e.g., via angle sensor 230). If the monitored angle exceeds a predetermined threshold where jackknifing is imminent, the trailer vehicle 202 is commanded to initiate its turn.

Figure 12:
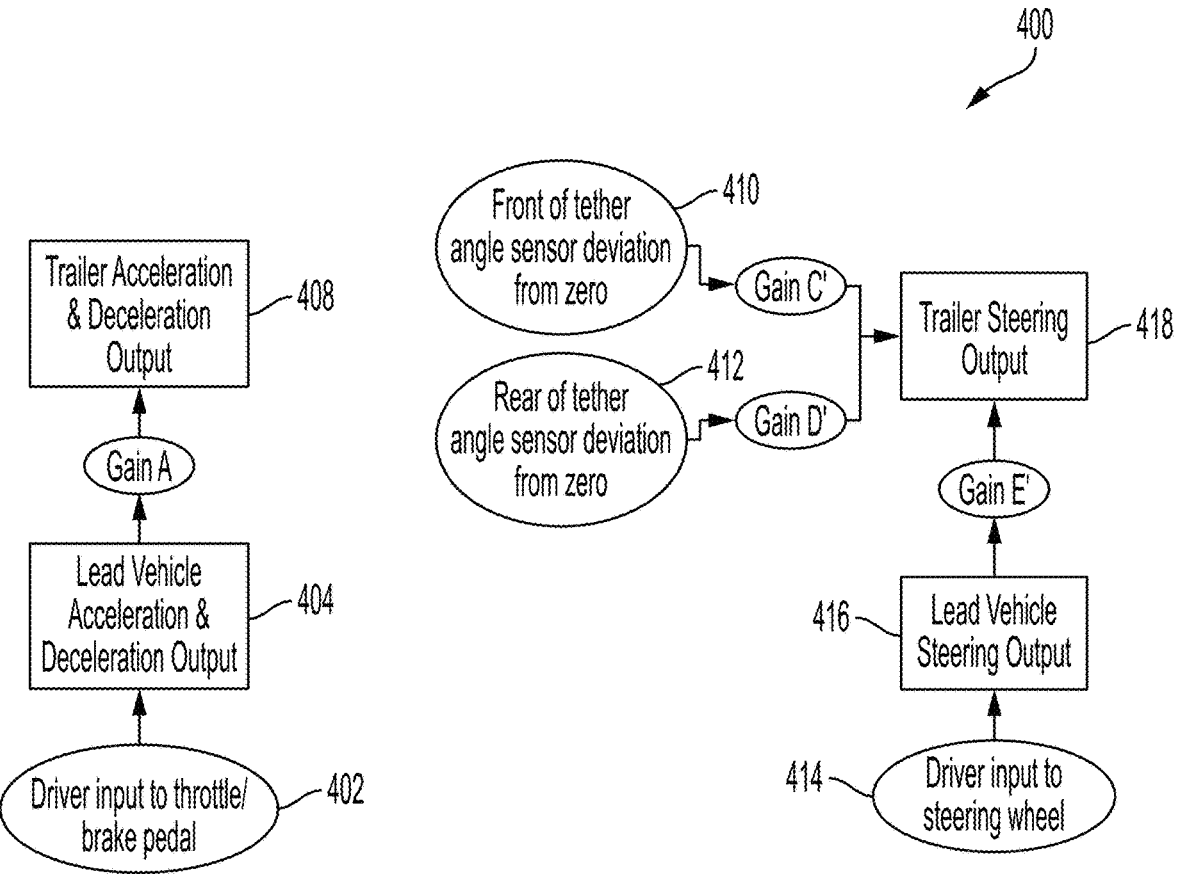

FIG. 12 illustrates a "trailer following lead vehicle through turn" operation where the trailer vehicle 202 executes a turning maneuver behind the lead vehicle 204. In this operation, the MVCS 310 is configured to determine a trailer acceleration/deceleration output and a trailer steering output based on driver input and sensor readings from tow bar system 200.

In this operation, MVCS 310 is configured to determine the trailer acceleration/deceleration and the trailer steering output in a manner similar to that described in FIG. 9, as shown by the same reference numerals. However, in the example embodiment, determination of the trailer steering output utilizes increased gains, where Gain C'>Gain C, Gain D'>Gain D, and Gain E'>Gain E.

In this operation, control initiates a tight steering input into trailer vehicle 202, with trailer steering locked in the direction of the turn to "catch up" with the lead vehicle 204, as at this point the tow bar 200 is at its maximum extension and any further separation between the lead vehicle 204 and trailer vehicle 202 may result in skidding. The gain values used to map angle measurements at the ends of the tow bar 200 to steering outputs are thus increased. Eventually, the trailer vehicle 202 begins to catch up to the lead vehicle 204, and the steering angle of the trailer vehicle 202 will decrease. MVCS 310 then monitors the steering angle of the lead vehicle 204 to go below a predetermined threshold indicating that the lead vehicle 204 is exiting the turn.

Figure 13:
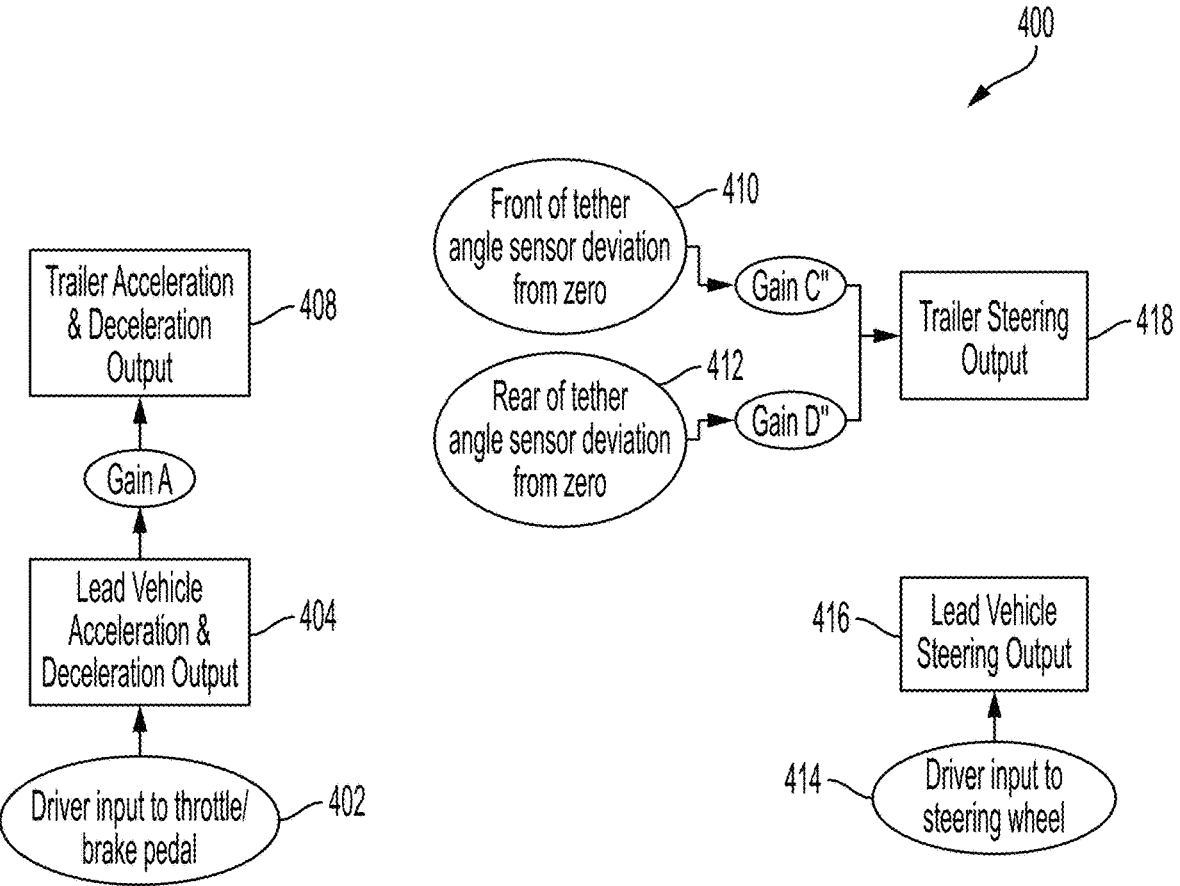

FIG. 13 illustrates a "trailer exits turn" operation where the trailer vehicle 202 completes the turning maneuver. In this operation, the MVCS 310 is configured to determine a trailer acceleration/deceleration output and a trailer steering output based on driver input and sensor readings from tow bar system 200.

In this operation, MVCS 310 is configured to determine the trailer acceleration/deceleration and the trailer steering output in a manner similar to that described in FIG. 9, as shown by the same reference numerals. However, in the example embodiment, determination of the trailer steering output 418 does not utilize lead vehicle steering output 416, and utilizes increased gains, where Gain C">Gain C', Gain D">Gain D', and D">C" to prevent premature straightening of the trailer vehicle 202.

During operation, as the lead vehicle 204 straightens out from the turn, the trailer vehicle steering angle does not imitate that of the lead vehicle 204, or it will straighten out prematurely. Accordingly, a tighter turn is maintained by the trailer vehicle 202 such that it finishes its turn.

Turning now to FIGS. 14-15, an example architecture 500 for MVCS 310 is illustrated showing operational capability and control of the lead vehicle 204 and trailer vehicle 202 during the high-speed forward driving scenario. In this scenario, the behavior of the multi-vehicle system is turned to accommodate emergency braking if necessary. Sudden accelerations and tight turns are not expected, so the nominal length of the sliding tow bar system 200 is set near the maximum value to allow for some latency between the braking responses of the lead vehicle 204 and the trailer vehicle 202. In this way, the trailer vehicle 202 does not impart undesirable force on the lead vehicle 204. The increased tow bar length has the added benefit of allowing the trailer vehicle 202 to drive with a sustained horizontal offset from the lead vehicle path of travel, which may be desirable for improving visibility for the driver or improving aerodynamic performance in cross-wind conditions.

FIG. 14 illustrates a "basic following" operation with the trailer vehicle 202 following the lead vehicle 204. This algorithm/operation may be initiated by monitoring and detecting a speed of the lead vehicle 204 has exceeded a predetermined speed threshold and confirm the vehicle is on a type of road (e.g., highway) where the maneuver may be safely executed. This may be determined by lane-monitoring cameras or GPS. In this operation, the MVCS 310 ("control") is configured to determine a trailer acceleration/deceleration output and a trailer steering output based on driver input and sensor readings from tow bar system 200.

At 502, the driver provides input to the throttle or brake pedal. At 504, control provides a lead vehicle acceleration or deceleration output and multiplies the output by Gain A. At 506, control determines a tether extension distance from nominal of the extension bar 304 of tow bar system 200. The tether extension distance is multiplied by a Gain B. At 508, control determines the trailer acceleration/deceleration output based on a sum of the lead vehicle throttle/brake multiplied by Gain A and the tether extension distance multiplied by Gain B.

At 510, control determines a deviation from zero of the front angle sensor 218, which is multiplied by a Gain C and utilized at box 518. At 512, control determines a deviation from zero of the rear angle sensor 230, which is multiplied by a Gain D and utilized at box 518. At 514, the driver provides input to the steering wheel of the lead vehicle 204. At 516, control provides a lead vehicle steering output based on the driver input (e.g., via a steering wheel angle sensor). This output is multiplied by Gain E and utilized at box 518.

At 518, control determines the trailer steering output based on a sum of the front tether angle deviation multiplied by Gain C, the rear tether angle deviation multiplied by Gain D, and the lead vehicle steering angle multiplied by Gain E.

In this operation, the nominal length of the sliding tow bar system 200 is set at or near the maximum distance (extension) to preserve a large amount of relative compression if needed for a sudden braking event. Here it is unlikely that an unexpected acceleration by the lead vehicle will occur and/or the forces incurred between the two vehicles would disrupt their intended operation. The MVCS 310 monitors for the driver to give the trailer vehicle 202 a command to bias toward one side of the lane/lead vehicle or the other side if conditions allow.

FIG. 15 illustrates an "offset following" operation with the trailer vehicle 202 being horizontally offset from behind the lead vehicle 204. This algorithm/operation may be initiated by a driver commanding a trailer vehicle offset. In this operation, the MVCS 310 is configured to determine a trailer acceleration/deceleration output and a trailer steering output based on driver input and sensor readings from tow bar system 200.

In the example operation, MVCS 310 is configured to determine the trailer acceleration/deceleration in a manner similar to that described in FIG. 14, as shown by the same reference numerals.

At 530, control determines/provides a predetermined Off-set Value is provided for the particular combination of parameters (e.g., size, weight, etc.) for the multi-vehicle system. At 532, control determines a deviation from the Offset Value of the front angle sensor 218, which is multi-plied by a Gain C and utilized at box 540. At 534, control determines a deviation from the offset value of the rear angle sensor 230, which is multiplied by a Gain D and utilized at box 540. At 536, the driver provides input to the steering wheel of the lead vehicle 204. At 538, control provides a lead vehicle steering output based on the driver input (e.g., via a steering wheel angle sensor). This output is multiplied by Gain E and utilized at box 540.

At 540, control determines the trailer steering output based on a sum of the front tether angle deviation multiplied by Gain C, the rear tether angle deviation multiplied by Gain D, and the lead vehicle steering angle multiplied by Gain E.

In this operation, the Offset Value is such that the trailer vehicle 202 biases horizontally from the lead vehicle in the direction specified by the driver, but remains within its lane of travel. This may require input from a lane-sensing camera system to avoid excursion into another lane. This system may only be allowed in highway driving scenarios.

Turning now to FIGS. 16-17, an example architecture 600 for MVCS 310 is illustrated showing operational capability and control of the lead vehicle 204 and trailer vehicle 202 during the low-speed reverse driving scenario. In this sce-nario, the behavior of the multi-vehicle system is tuned such that the driver of the lead vehicle steers as if they were reversing without a trailer. The trailer vehicle 202 behaves as the "lead vehicle" by initiating turns and being followed by the lead vehicle 204. In some examples, the steering inputs made by the driver will not be translated direct to outputs by the wheels of the lead vehicle 204.

FIG. 16 illustrates a "basic following" or "shallow turn" operation with the lead vehicle 204 following the trailer vehicle 202. This algorithm/operation may be initiated by monitoring the tow bar angle to when it crosses zero from the direction opposite the turn to the direction of the trailer turn. In this operation, the MVCS 310 is configured to determine a lead vehicle acceleration/deceleration output and a lead vehicle steering output based on driver input and sensor readings from tow bar system 200.

At 602, the driver provides input to the throttle or brake pedal. At 604, control provides a trailer vehicle acceleration or deceleration output (based on the driver input at 602) and multiplies the output by Gain A. At 606, control determines a tether extension distance from nominal of the extension bar 304 of tow bar system 200. The tether extension distance is multiplied by a Gain B. At 608, control determines the lead vehicle acceleration/deceleration output based on a sum of the lead vehicle throttle/brake multiplied by Gain A and the tether extension distance multiplied by Gain B.

At 610, control determines a deviation from zero of the front angle sensor 218, which is multiplied by a Gain C and utilized at box 618. At 612, control determines a deviation from zero of the rear angle sensor 230, which is multiplied by a negative coefficient (−1) and Gain D and utilized at box 618. At 614, the driver provides input to the steering wheel of the lead vehicle 204. At 616, control provides a trailer vehicle steering output based on the driver input (e.g., via a steering wheel angle sensor). This output is multiplied by a negative coefficient (−1) and Gain E and utilized at box 618.

At 618, control determines the trailer steering output based on the front tether angle deviation multiplied by Gain C, subtracted by the rear tether angle deviation multiplied by Gain D, and further subtracted by the lead vehicle steering angle multiplied by Gain E.

In this operation, the maneuver is similar to how a traditional lead vehicle would initiate a turn with an un-powered trailer by steering in the opposite direction. How-ever, the opposite steering required by the lead vehicle is significantly less than would be required to force the trailer vehicle to initiate a turn. The steering inputs made by the driver are directly executed by the front axle of the trailer vehicle 202, while the lead vehicle 204 steers in a direction that slightly opposes the trailer steering direction, allowing it to remain in its lane without significantly increasing the chorded distance between the rear of the lead vehicle 204 and the front of the trailer vehicle 202.

Further, the nominal length of the sliding tow bar 200 is set to a closer (minimum) following distance to preserve a large amount of relative extension if needed for a tight turning maneuver. Here it is unlikely that an unexpected deceleration by the trailer vehicle will occur and/or the forces incurred between the two vehicles 202, 204 would disrupt their intended operation. In shallow turns, the angle created between the tow bar 200 and the lead vehicle 204 is opposite the direction of the turn due to the wide path of travel taken by the trailer vehicle front axle. MVCS 310 monitors for the tow bar angle to cross zero from the direction opposite the turn to the direction of the trailer turn to trigger the algorithm for tighter turns to be executed.

FIG. 17 illustrates a "tight reversing turn" operation with the lead vehicle 204 following the trailer vehicle 202. This turning algorithm/operation may be initiated by monitoring the driver steering input angle (trailer steering angle) to return to zero for the system to then return to the basic following operation. In this operation, the MVCS 310 is configured to determine a lead vehicle acceleration/decel-eration output and a lead vehicle steering output based on driver input and sensor readings from tow bar system 200.

In the example operation, MVCS 310 is configured to determine the lead vehicle acceleration/deceleration in a manner similar to that described in FIG. 16, as shown by the same reference numerals.

At 620, control determines a deviation from zero of the front angle sensor 218, which is multiplied by a Gain C and utilized at box 628. At 622, control determines a deviation from zero of the rear angle sensor 230, which is multiplied by a Gain D and utilized at box 628. At 624, the driver provides input to the steering wheel of the lead vehicle 204. At 626, control provides a trailer vehicle steering output based on the driver input (e.g., via a steering wheel angle sensor). This output is multiplied by Gain E and utilized at box 428.

At 428, control determines the lead vehicle steering output based on a sum of the front tether angle deviation multiplied by Gain C, the rear tether angle deviation multiplied by Gain D, and the trailer vehicle steering angle multiplied by Gain E.

In this operation, the lead vehicle 204 steers in the same direction as the trailer vehicle to follow the trailer vehicle around the corner. The gain values relating the tow bar angles to the lead vehicle steering output are increased so that the lead vehicle 204 can follow the trailer vehicle 202 around the tight corner. In one example, a longer trailer should not turn more tightly than a shorter lead vehicle. The nominal length of the tow bar is increased to allow maximum distance between the front of the trailer vehicle 202 and the rear of the lead vehicle 204 to avoid a jackknife condition. MVCS 310 monitors for the driver steering input angle (trailer steering angle) to return zero for the system to return to the basic following operation.

Described herein are systems and methods for dynamically controlling a multi-vehicle system with an independently powered and controlled lead vehicle and trailer vehicle. A tow bar system is connected between the two vehicles and includes a free sliding, length sensing hitch configured to sense a change in length of the tow bar. A control system utilizes inputs from the two vehicles and tow bar system to determine appropriate trailer vehicle acceleration/deceleration and steering outputs for a given driving scenario, to thereby improve dynamic performance, stability, and maneuverability. The control system also adjusts the length of extension of the tow bar for the given driving scenario, by controlling relative positioning of the lead and trailer vehicles, to thereby improve operation.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A multi-vehicle control system (MVCS) for control of a multi-vehicle system having independently powered and steered lead and trailer vehicles connected by a slidable length sensing tow bar system, the MVCS comprising:

a controller in signal communication with the lead vehicle, the trailer vehicle, and the slidable length sensing tow bar system, the controller configured to:

receive throttle, brake, and steering signals from the lead vehicle;

receive signals from the tow bar system indicating an extension length of the tow bar system, a front angle deviation of the lead vehicle, and a rear angle deviation of the trailer vehicle;

determine, based on the received signals, a trailer vehicle acceleration/deceleration output and a trailer vehicle steering output;

determine a driving scenario of the multi-vehicle system; and operate the multi-vehicle system based on the determined driving scenario and the determined trailer vehicle acceleration/deceleration output and trailer vehicle steering output.

2. The MVCS of claim 1, wherein the extension length of the tow bar system is determined by a length sensor operably associated with a free sliding bar of the tow bar system.

3. The MVCS of claim 1, wherein the front angle deviation is determined from a first angle sensor configured to sense an angle between the lead vehicle and a first end of the tow bar system, and wherein the rear angle deviation is determined from a second angle sensor configured to sense an angle between the trailer vehicle and a second end of the tow bar system.

4. The MVCS of claim 1, wherein the trailer vehicle acceleration/deceleration output is determined by the sum of:

a lead vehicle acceleration/deceleration output, based on a driver throttle and/or brake pedal input, multiplied by a first controller gain; and the extension length of the tow bar system multiplied by a second controller gain.

5. The MVCS of claim 1, wherein the trailer vehicle steering output is determined by the sum of:

the front angle deviation multiplied by a first controller gain;

the rear angle deviation multiplied by a second controller gain; and a lead vehicle steering output, based on a driver steering wheel input, multiplied by a third controller gain.

6. The MVCS of claim 5, wherein the controller is further configured to:

determine if a steering angle of the lead vehicle is above a predetermined threshold indicating a tight turning maneuver of the lead vehicle; and adjust the third controller gain if the determined steering angle is above the predetermined threshold to thereby induce a steering bias to the trailer vehicle to an outside of a turning path of the lead vehicle.

7. The MVCS of claim 5, wherein the controller is further configured to:

detect an upcoming tight turning maneuver of the lead vehicle; and apply an offset value to the first and second controller gains to thereby bias the trailer vehicle horizontally from the lead vehicle in a direction opposite of the detected tight turning maneuver to thereby stage the trailer vehicle for the tight turning maneuver.

8. The MVCS of claim 5, wherein the controller is further configured to:

detect a turning maneuver of the lead vehicle;

temporarily set the trailer vehicle steering output to zero to maintain a straight path of the trailer vehicle while the lead vehicle executes a portion of the turning maneuver;

monitor one or more wheel speed sensors of the trailer vehicle to determine the trailer vehicle has traveled a predefined distance with the steering output at zero; and subsequently initiate a turning maneuver of the trailer vehicle when the trailer vehicle has traveled the predefined distance.

9. The MVCS of claim 8, wherein the controller is further programmed to control the trailer vehicle through the turning maneuver, comprising:

adjusting the first, second, and third controller gains to decrease a distance between the lead vehicle and the trailer vehicle; and further adjusting the first, second, and third controller gains to extend turning of the trailer vehicle after the lead vehicle has exited the turning maneuver.

10. The MVCS of claim 1, wherein the determined driving scenario is a low-speed forward driving scenario, and wherein the controller is further configured to:

control the relative positions of the lead vehicle and the trailer vehicle such that a nominal length of the slidable tow bar system is set to a minimum to thereby provide a large amount of relative extension to enable the multi-vehicle system to perform a turning maneuver.

11. The MVCS of claim 1, wherein the determined driving scenario is a high-speed forward driving scenario, and wherein the controller is further configured to:

control the relative positions of the lead vehicle and the trailer vehicle such that a nominal length of the slidable tow bar system is set to a maximum to thereby provide a large amount of relative compression in the event of a sudden braking by the lead vehicle.

12. The MVCS of claim 5, wherein the determined driving scenario is a high-speed forward driving scenario, and wherein the controller is further configured to:

apply an offset value to the first and second controller gains to thereby bias the trailer vehicle horizontally from the lead vehicle to facilitate improving visibility behind the lead vehicle and/or improving aerodynamic performance of the multi-vehicle system.

13. The MVCS of claim 1, wherein the determined driving scenario is a low-speed reverse driving scenario, and wherein the controller is further configured to:

control the relative positions of the lead vehicle and the trailer vehicle such that a nominal length of the slidable tow bar system is set to a minimum to thereby provide a large amount of relative extension to enable the multi-vehicle system to perform a reverse turning maneuver.

14. The MVCS of claim 1, wherein the determined driving scenario is a low-speed reverse driving scenario, and wherein the controller is further configured to:

control a front axle of the trailer vehicle based on steering inputs on the lead vehicle such that the lead vehicle steers in a direction that opposes a steering direction of the trailer vehicle.

15. The MVCS of claim 5, wherein the determined driving scenario is a low-speed reverse driving scenario, and wherein the controller is further configured to:

determine a trailer steering output, based on a driver steering wheel input on the lead vehicle; and determine a lead vehicle steering output, determined by: the front angle deviation multiplied by a first controller gain, subtracted by the rear angle deviation multiplied by a second controller gain, and further subtracted by the trailer steering output multiplied by a third controller gain.

16. A control method for a multi-vehicle system having a multi-vehicle control system (MVCS) in signal communication with independently powered and steered lead and trailer vehicles connected by a slidable length sensing tow bar system, the method comprising:

receiving, by a controller of the MVCS, throttle, brake, and steering signals from the lead vehicle;

receiving, by the controller, signals from the tow bar system indicating an extension length of the tow bar system, a front angle deviation of the lead vehicle, and a rear angle deviation of the trailer vehicle;

determining, by the controller and the received signals, a trailer vehicle acceleration/deceleration output and a trailer vehicle steering output;

determining, by the controller, a driving scenario of the multi-vehicle system; and operating, by the controller, the multi-vehicle system based on the determined driving scenario and the determined trailer vehicle acceleration/deceleration output and trailer vehicle steering output.

17. The method of claim 16, wherein the extension length of the tow bar system is determined by a length sensor operably associated with a free sliding bar of the tow bar system.

18. The method of claim 16, wherein the front angle deviation is determined from a first angle sensor configured to sense an angle between the lead vehicle and a first end of the tow bar system, and wherein the rear angle deviation is determined from a second angle sensor configured to sense an angle between the trailer vehicle and a second end of the tow bar system.

* * * * *